(12) United States Patent  (10) Patent No.: US 8,946,134 B2
Mikami et al.  (45) Date of Patent: Feb. 3, 2015

(54) GREASE COMPOSITION, GREASE-PACKED BEARING, UNIVERSAL JOINT FOR PROPELLER SHAFT, LUBRICATING OIL COMPOSITION, AND OIL-IMPREGNATED SINTERED BEARING

(75) Inventors: Hidenobu Mikami, Kuwana (JP); Yosuke Taguchi, Kuwana (JP); Takayuki Kawamura, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/138,331

(22) PCT Filed: Feb. 24, 2010

(86) PCT No.: PCT/JP2010/052822
§ 371 (c)(1),
(2), (4) Date: Aug. 30, 2011

(87) PCT Pub. No.: WO2010/098337
PCT Pub. Date: Sep. 2, 2010

(65) Prior Publication Data
US 2011/0306429 A1  Dec. 15, 2011

(30) Foreign Application Priority Data

Feb. 27, 2009 (JP) ............... P2009-045709
Sep. 16, 2009 (JP) ............... P2009-214162
Sep. 16, 2009 (JP) ............... P2009-214168
Nov. 27, 2009 (JP) ............... P2009-270651
Nov. 27, 2009 (JP) ............... P2009-270673

(51) Int. Cl.
*C10M 129/02* (2006.01)
*F16C 33/10* (2006.01)
(Continued)

(52) U.S. Cl.
CPC ............ *F16C 33/104* (2013.01); *C10M 129/14* (2013.01); *C10M 159/02* (2013.01);
(Continued)

(58) Field of Classification Search
CPC ............ C10M 129/02; C10M 129/04; C10M 129/06; C10M 129/08; C10M 129/12; C10M 129/16; C10M 129/18; C10M 129/20; C10M 129/24; C10M 129/68; C10M 129/92; C10M 129/93; C10M 129/94; C10M 2207/02
USPC ......... 508/577, 584, 585, 459, 465, 478, 483, 508/506, 525, 526, 531, 532, 578, 580
See application file for complete search history.

(56) References Cited

U.S. PATENT DOCUMENTS 3,537,994 A * 11/1970 House ............................ 508/140
3,639,242 A * 2/1972 Le Suer ......................... 508/486
(Continued)

FOREIGN PATENT DOCUMENTS

CN       1678721        5/2005
CN      101155902 A     4/2008
(Continued)

*Primary Examiner* — Taiwo Oladapo
(74) *Attorney, Agent, or Firm* — Hedman & Costigan, P.C.; James V. Costigan; Kathleen A. Costigan

(57) ABSTRACT

The present invention provides a grease composition or a lubricating oil composition which is capable of effectively preventing hydrogen brittleness-caused peeling from occurring on a rolling surface of a rolling bearing, is excellent in durability in a high temperature and speed operation, and can be used for a long time. A grease-packed bearing (1) has an inner ring (2), an outer ring (3), and a plurality of rolling elements (4). A sealing member (6) for sealing a grease composition (7) is provided at openings (8a) and (8b) disposed at both axial ends of the inner ring (2) and the outer ring (3). The grease composition (7) includes a base grease composed of a base oil and a thickener and an additive added to the base grease. The additive contains at least one compound selected from among plant-derived polyphenolic compounds and compounds formed by decomposition thereof. The above-described compounds include tannin, gallic acid, ellagic acid, chlorogenic acid, caffeic acid, curcumin, quercetin, and quinic acid.

8 Claims, 8 Drawing Sheets

(51) Int. Cl.
    *C10M 129/14*     (2006.01)
    *C10M 159/02*     (2006.01)
    *F16C 33/66*     (2006.01)
    *F16D 3/227*     (2006.01)

(52) U.S. Cl.
CPC ............ *F16C33/6633* (2013.01); *F16D 3/227* (2013.01); *C10M 2203/1006* (2013.01); *C10M 2205/0285* (2013.01); *C10M 2207/026* (2013.01); *C10M 2207/0406* (2013.01); *C10M 2207/08* (2013.01); *C10M 2207/1256* (2013.01); *C10M 2207/128* (2013.01); *C10M 2207/1285* (2013.01); *C10M 2207/144* (2013.01); *C10M 2207/2805* (2013.01); *C10M 2207/2835* (2013.01); *C10M 2207/289* (2013.01); *C10M 2211/063* (2013.01); *C10M 2213/043* (2013.01); *C10M 2213/0613* (2013.01); *C10M 2213/0626* (2013.01); *C10M 2215/064* (2013.01); *C10M 2215/1026* (2013.01); *C10M 2215/224* (2013.01); *C10M 2219/044* (2013.01); *C10M 2223/045* (2013.01); *C10N 2220/022* (2013.01); *C10N 2220/04* (2013.01); *C10N 2230/06* (2013.01); *C10N 2230/08* (2013.01); *C10N 2240/02* (2013.01); *C10N 2250/10* (2013.01); *F16D 2300/06* (2013.01)

USPC ........... 508/459; 508/465; 508/478; 508/483; 508/506; 508/525; 508/526; 508/531; 508/532; 508/577; 508/578; 508/580; 508/584; 508/585

(56) References Cited

U.S. PATENT DOCUMENTS

| | | | | |
|---|---|---|---|---|
| 4,425,244 | A * | 1/1984 | House | 508/143 |
| 5,346,943 | A * | 9/1994 | Khungar et al. | 524/398 |
| 5,719,194 | A * | 2/1998 | Mann et al. | 514/723 |
| 8,258,088 | B2 * | 9/2012 | Bodesheim et al. | 508/244 |
| 2001/0016563 | A1 | 8/2001 | Takabe | |
| 2006/0019840 | A1 * | 1/2006 | Kawahara et al. | 508/280 |
| 2008/0196995 | A1 | 8/2008 | Mikami | |
| 2008/0274073 | A1 * | 11/2008 | Bell et al. | 424/78.02 |
| 2009/0069204 | A1 | 3/2009 | Kamimura | |
| 2009/0074702 | A1 * | 3/2009 | Allard et al. | 424/70.121 |
| 2009/0155447 | A1 * | 6/2009 | Moore et al. | 426/656 |
| 2009/0281008 | A1 | 11/2009 | Fujinami et al. | |
| 2010/0105586 | A1 * | 4/2010 | Bodesheim et al. | 508/244 |

FOREIGN PATENT DOCUMENTS

| | | | |
|---|---|---|---|
| CN | 101163781 A | | 4/2008 |
| CN | 101223263 A | | 7/2008 |
| EP | 1 867 706 | | 12/2007 |
| FR | 2 803 639 | | 1/2003 |
| JP | 55065398 A | * | 5/1980 |
| JP | 56116881 A | * | 9/1981 |
| JP | 03-210394 | | 9/1991 |
| JP | 05-209623 | | 8/1993 |
| JP | 09-118824 | | 5/1997 |
| JP | 09-208982 | | 8/1997 |
| JP | 11-270566 | | 10/1999 |
| JP | 2000-514105 | | 10/2000 |
| JP | 2001-107073 | | 4/2001 |
| JP | 2001-193751 | | 7/2001 |
| JP | 2002-021859 | | 1/2002 |
| JP | 2002-327759 | | 11/2002 |
| JP | 2004-183868 | | 7/2004 |
| JP | 2004-339270 | | 12/2004 |
| JP | 2005-421012 | | 2/2005 |
| JP | 2005-097513 | | 4/2005 |
| JP | 2005-97514 | | 4/2005 |
| JP | 2008-138138 | | 6/2006 |
| JP | 2006-249368 | | 9/2006 |
| JP | 2004-283830 | | 10/2006 |
| JP | 2006-291011 | | 10/2006 |
| JP | 2007-270127 | | 10/2007 |
| JP | 2008-297447 | | 12/2008 |
| JP | 2008297447 A | * | 12/2008 |
| KR | 10-2007-0116624 | | 12/2007 |
| WO | WO 97/47710 | | 12/1997 |
| WO | 03/018729 A1 | | 3/2003 |
| WO | WO 2004/018595 | | 3/2004 |
| WO | WO 2006-109652 | | 10/2006 |
| WO | WO 2008154997 A1 | * | 12/2008 |
| WO | 2010/079743 A1 | | 7/2010 |

* cited by examiner (a)

(b)

GREASE COMPOSITION, GREASE-PACKED BEARING, UNIVERSAL JOINT FOR PROPELLER SHAFT, LUBRICATING OIL COMPOSITION, AND OIL-IMPREGNATED SINTERED BEARING

TECHNICAL FIELD

The present invention relates to a grease composition and a lubricating oil composition to be used for lubrication and more particularly to a grease composition and a lubricating oil composition containing plant-derived polyphenolic compounds as an additive thereof. The present invention also relates to a grease-packed bearing and a universal joint for a propeller shaft. The grease composition is used for both. More specifically the present invention relates to a rolling bearing to be used for electric parts and auxiliary machines of a car such as an alternator, a compressor, an electromagnetic clutch for an air conditioner, an intermediate pulley, an electromotive fan motor, and the like; a rolling bearing to be used for various motors; a rolling bearing to be used for a fixing roller of a copying machine; a constant-velocity joint to be used for a propeller shaft of the car; and a cardan joint to be used for the propeller shaft. The present invention also relates to an oil-impregnated formed by impregnating a sintered molded bearing with the lubricating oil composition.

BACKGROUND ART

The electric parts and auxiliary machines of the car and motors of industrial machines are demanded to be compact and have high performance and output year by year. Thus use conditions have become strict. The rolling bearing is used therefor. The grease composition is used to lubricate the rolling bearing. Because the use condition such as a high-speed rotation at high temperatures for the rolling bearing has become strict, there is a fear that a peculiar peeling phenomenon occurs with the rolling surface of the rolling bearing turning into white in its texture.

Unlike peeling which occurs from the inside of the rolling surface owing to normal metal fatigue, the peculiar peeling phenomenon is a destruction phenomenon which occurs from a comparatively shallow portion of the rolling surface. This is considered peeling owing to hydrogen brittleness owing to hydrogen generated caused by decomposition of the grease composition. As methods of preventing the peculiar peeling phenomenon from occurring in an early stage with the rolling surface turning into white in its texture, the method of adding a passivating agent to the grease composition is known (see patent document 1). The method of adding bismuth dithiocarbamate to the grease composition is also known (see patent document 2).

In recent years, there is a tendency for general-purpose motors such as an AC motor, a DC motor, and the like to be made smaller. As a result, bearings supporting rotors of motors tend to be operated at a higher speed and under a higher surface pressure. The grease composition is packed in these motors to impart lubricating property thereto. The grease composition is obtained by kneading a base oil, a thickener, and an additive as necessary. As the base oil, synthetic lubricating oil such as mineral oil, ester oil, silicone oil, and ether oil is generally used. As the thickener, a metal soap such as a lithium soap and urea-based compounds are generally used. As the additive, an antioxidant, a rust proof agent, a metal deactivator, a viscosity index improver, and the like are used.

To improve the high-temperature durability of the lubricating oil and the grease composition for use in a bearing and the like, as the antioxidant, organic zinc compounds such as zinc alkyldithiophosphate and amine compounds such as alkylated diphenylamine are used singly or in combination.

Bearings for motors for use in home electrical appliances and industrial equipment are used in a high temperature and speed rotation and demanded to be excellent in quietness and durability in high temperatures and high speeds. As the grease composition which is excellent in the high-temperature durability, suppresses abnormal noise when it is cold, and excellent in a peeling resistance property at a high temperature and under a high load, a composition composed of a base oil consisting of synthetic hydrocarbon oil and ester oil and a urea-based thickener added to the base oil is known (see patent documents 3 and 4). As a lubricating composition having a long life until before seizing occurs in a high temperature and speed rotation condition, a composition containing ester oil as its base oil and 3 to 30 wt % of a thickener essentially containing an aliphatic diurea compound (see patent document 5) is known.

A propeller shaft for an FR car and a 4WD car couples a transmission side and a differential gear side to each other. A universal joint is provided at a proper position between the transmission side and the differential gear side. As a lubricant for the universal joint, grease for a wheel bearing and general-purpose grease have been used more than other kind of lubricants.

An electromagnetic clutch, an alternator, a flywheel damper which are electric parts and auxiliary machines are heated to high temperatures. Therefore as grease compositions to be packed in the rolling bearing for the electric parts and auxiliary machines, urea-based grease is generally used. As a grease composition to be packed in the rolling bearing for a fan clutch which is heated to an ultra-high temperature in the neighborhood of 200° C., fluorine grease using fluororesin particles as its thickener and perfluoropolyether oil as its base oil is used.

A heat roller of a copying machine heats toner composed of thermoplastic resin and a coloring agent to fix the melted toner to paper surface under pressure. Therefore the rolling bearing supporting the heat roller into which a heated is inserted is heated to ultra-high temperatures in the neighborhood of 200° C. Thus the fluorine grease is packed in the rolling bearing supporting the heat roller.

A ball bearing (see patent document 6) in which the grease composition containing the fluorine oil and the oil which has a lower specific gravity than the fluorine oil and does not mix with the fluorine oil as its base oil is packed. A grease composition (see patent document 7) using aromatic ester, polyphenyl ether, alkylated polyphenyl ether, ester oil, and perfluoro-polyalkyl ether oil as its base oil, dicarbamide as its thickener, PTFE and polyimide as its solid lubricant, and the additive generally used is also known.

Generally as the lubricant for the bearing, the lubricating oil composition or the grease composition is used more than other kind of lubricants. As the base oil contained in the lubricating oil composition or the grease composition as the main component thereof, synthetic oil such as mineral oil, poly-α-olefin (hereinafter referred to as PAO) oil, ester oil, silicone oil, and fluorine oil are used. In recent years, from the standpoint of energy saving, the lubricating oil composition or the grease composition for the bearing is demanded to have low friction and viscosity. As described above, with an increase in the demand for the development of the bearing which is compact and has high performance, there is a growing demand that the lubricant to be packed in the bearing has improved durability at high temperatures.

As a technique suggesting the possibility of a solution for the demand, for example, a fluid bearing apparatus (see patent document 8) using the lubricant to which the ionic liquid is added as the conductivity-imparting agent is known. The grease composition (see patent document 9) composed of the base oil containing the ionic liquid and the thickener is also known. In the above-described lubricant and grease composition, the property of the ionic liquid which is an ambient temperature molten salt has a low viscosity owing to the combination of various organic ions is utilized.

Many bearings for rotatably supporting rotating parts such as a photosensitive drum and various kinds of rollers are used for a copying machine and a printer. The photosensitive drum forms an electrostatic latent image on its surface to which electrically charged toner is attached to transfer a toner image to paper. Because high rotation accuracy is demanded in the field of an electrophotographic apparatus, a rolling bearing has been used. But the rolling bearing has a large number of parts. Thus application of inexpensive sliding bearings has been attempted for an economic reason. As such a sliding bearing, an oil-impregnated sintered bearing is exemplified.

Lubricating oil is impregnated into pores of a sintered molded bearing and held thereby and oozed out to the sliding surface of the oil-impregnated sintered bearing when it is used to allow it to have a stable frictional property for a long time.

The sintered molded bearing is obtained by performing compression molding of fine particles of iron, copper, zinc, tin, graphite, nickel or mixing fine particles of these metals with each other to form an alloy, and performing compression molding of the alloy, firing, and sizing. The sintered molded bearing has a uniform porous tissue.

As the lubricating oil impregnated into the sintered molded bearing, synthetic lubricating oil (see patent document 10) such as mineral oil, diester oil, PAO oil, and ether oil is known.

The oil-impregnated sintered bearing composed of the above-described materials is less expensive than the rolling bearing in its production cost. Therefore the oil-impregnated sintered bearing is spreading in its utilization range as the bearing applicable to use in a high-temperature atmosphere inside the copying machine, the printer, and the like because recently the copying machine, the printer, and the like have become compact and have high performance such as high-speed printing.

A rolling bearing (see patent document 11) in which fluorine grease is packed and a sliding bearing (see patent document 12) using polyphenylene sulfide resin and polyimide resin have been used in the high-temperature atmosphere.

PRIOR ART DOCUMENT

Patent Document

Patent document 1: Japanese Patent Application Laid-Open No. 3-210394
Patent document 2: Japanese Patent Application Laid-Open No. 2005-42102
Patent document 3: Japanese Patent Application Laid-Open No. 9-208982
Patent document 4: Japanese Patent Application Laid-Open No. 11-270566
Patent document 5: Japanese Patent Application Laid-Open No. 2001-107073
Patent document 6: Japanese Patent Application Laid-Open No. 2002-21859
Patent document 7: Japanese Patent Application Laid-Open No. 2000-514105
Patent document 8: Japanese Patent Application Laid-Open No. 2004-183868
Patent document 9: Japanese Patent Application Laid-Open No. 2006-249368
Patent document 10: Japanese Patent Application Laid-Open No. H05-209623
Patent document 11: Japanese Patent Application Laid-Open No. 2002-327759
Patent document 12: Japanese Patent Application Laid-Open No. H09-118824

DISCLOSURE OF THE INVENTION

Problem to be Solved by the Invention

In recent years, in electric parts and auxiliary machines of a car and motors of industrial machines, high-speed operation—sudden deceleration operation—sudden acceleration operation—sudden stop is frequently performed at high temperatures. Thus the use condition of the rolling bearing has become increasingly strict. Therefore the method (patent document 1) of adding the passivating agent to the grease composition and the method (patent document 2) of adding the bismuth dithiocarbamate to the grease composition are insufficient as measures for preventing the peeling phenomenon.

The lubricating (grease) compositions disclosed in the patent documents 3 through 7 or these lubricating (grease) compositions to which conventional antioxidants are added in combination cannot necessarily satisfy the durability required at a high temperature and speed rotation when the lubricating (grease) compositions are packed in bearings which are used for the electric parts and auxiliary machines of the car, fixing rollers of the copying machine, home electrical appliances, and industrial equipment developed in recent years.

In recent years, in compliance with the demand for decreasing the size and weight of the car and for quietness, attempts for decreasing the size and weight of the electric parts and auxiliary machines and sealing of an engine room are made. Apparatuses are demanded to have high output and efficiency in the performance thereof. The grease composition to be packed in the rolling bearings for the electric parts and auxiliary machines must withstand ultrahigh temperatures. As the grease composition to be packed in the rolling bearings for a fan clutch and the heat roller of the copying machine, which is heated to an ultra-high temperature in the neighborhood of 200° C., fluorine grease is used. Because the fluorine grease is expensive, it prevents a decrease in the cost of the grease composition and the grease-packed bearing.

Description is made in the patent document 8 that when the lubricant contains the ionic liquid which is a conductivity-imparting additive, it is possible to stably operate the bearing and achieve a low torque loss without accumulation of static electricity even when the bearing is subjected to a high-speed rotation. But in the patent document 8, whether it is possible to obtain the effect of decreasing the viscosity of the lubricant and the effect of improving the durability at high temperatures by the containing of the ionic liquid is unclear. Although a low viscosity of the grease composition is obtained by using the ionic liquid, it is anticipated that the corrosion of the bearing steel is easy to progress. The lubricant is not sufficient for enhancing the durability at high temperatures.

It cannot be said that in a strict environment where the universal joint for the propeller shaft is used under conditions of sealing, a high temperature, a high speed, a high torque, and a high angle, the grease for the wheel bearing and the general-purpose grease cannot necessarily satisfy the required performance. Therefore the development of the universal joint for the propeller shaft capable of displaying an excellent performance even in the strict environment is desired.

When the conventional oil-impregnated sintered bearing described in the patent document 10 is used in an atmosphere having high temperatures of 120 to 130° C. or higher, there is a fear that the lubricating oil undergoes oxidative deterioration in a short period of time. Therefore there is a fear that the torque of the rotating shaft rises and seizing occurs early after the use of the bearing starts.

To use the oil-impregnated sintered bearing as a replacement of the rolling bearing, it is necessary to support a thrust load by the end surface of the bearing through a washer in addition to supporting of a radial load. In this case, required lubricating property, extreme pressure, thermal stability for friction heat are demanded for the lubricating oil impregnated into the bearing. But an oil-impregnated sintered bearing which uses lubricating oil satisfying these performances is unknown. The rolling bearing disclosed in the patent document 11 and the sliding bearing disclosed in the patent document 11 are very expensive.

The present invention has been made to solve the above-described problems. That is, it is an object of the present invention to provide a grease composition which is capable of effectively preventing hydrogen brittleness-caused peeling from occurring on a rolling surface of a rolling bearing and the like, is excellent in durability at high temperatures and high speeds, and can be used for a long time. It is another object of the present invention to provide a grease composition which has a low friction, a low viscosity, and is inexpensive. It is still another object of the present invention to provide a bearing in which the grease composition of the present invention is packed and a universal joint for a propeller shaft.

It is still another object of the present invention to provide a lubricating oil composition capable of imparting a stable frictional property to an oil-impregnated sintered bearing for a long time under a strict condition in which the oil-impregnated sintered bearing is subjected to thrust and radial loads simultaneously in a high-temperature atmosphere. It is still another object of the present invention to provide the oil-impregnated sintered bearing formed by impregnating a sintered molded bearing with the lubricating oil composition.

Means for Solving the Problem

The grease composition of the present invention includes a base grease composed of a base oil and a thickener and an additive added to the base grease. The additive contains at least one compound selected from among (1) plant-derived polyphenolic compounds and (2) compounds formed by decomposition thereof.

The plant-derived polyphenolic compounds is tannin. The plant-derived polyphenolic compounds is gallic acid, ellagic acid, chlorogenic acid, caffeic acid, curcumin, and quercetin or a derivative of any of the plant-derived polyphenolic compounds. A derivative of the gallic acid is ethyl gallate.

Each of the compounds formed by decomposition of the plant-derived polyphenolic compounds has a plurality of hydroxyl groups in one molecule thereof. The compounds formed by decomposition of the plant-derived polyphenolic compounds is quinic acid or a derivative thereof.

A mixing ratio of each of the compounds is 0.05 to 10 parts by weight for 100 parts by weight of the base grease.

A kinematic viscosity of the base oil is 10 to 100 $mm^2$/second at 40° C.

The base oil is at least one oil selected from among alkyl-diphenyl ether oil, ester oil, and poly-α-olefin oil.

The thickener is a urea-based compound. The thickener is a metal soap.

The base oil contains anionic liquid composed of a cation component and an anion component. The cation component is an imidazolium cation. The anion component is a bis(trifluoromethylsulfinyl)imide anion. In using the base oil containing the ionic liquid, the thickener is fluororesin particles.

The base oil is perfluoropolyether oil. The thickener is fluororesin particles. The fluororesin particles are polytetrafluoroethylene (hereinafter referred to as PTFE) resin particles.

The grease composition is packed in the grease-packed bearing of the present invention. The grease-packed bearing includes an inner ring, an outer ring, a plurality of rolling elements interposed between the inner ring and the outer ring, and a sealing member, for sealing the grease composition on peripheries of the rolling elements, which is provided at openings disposed at both axial ends of the inner ring and the outer ring. The grease-packed bearing is a deep groove ball bearing.

The grease-packed bearing is a rolling bearing which is used for motors of industrial machines or electric equipment and supports rotors of the motors. The grease-packed bearing is a rolling bearing for use in electric parts and auxiliary machines of a car. The grease-packed bearing is a rolling bearing for use in a fixing roller of a copying machine.

A universal joint of the present invention for a propeller shaft transmits a rotational torque transmitted from a transmission to the propeller shaft. The grease composition is packed inside the universal joint.

The lubricating oil composition of the present invention is impregnated into a sintered molded bearing to obtain an oil-impregnated sintered bearing and is composed of a lubricating oil and an additive added thereto. The additive contains at least one compound selected from among (1) plant-derived polyphenolic compounds and (2) compounds formed by decomposition thereof. Each of the compounds formed by decomposition of the plant-derived polyphenolic compounds has a plurality of hydroxyl groups in one molecule thereof.

The plant-derived polyphenolic compounds is tannin. The plant-derived polyphenolic compounds is gallic acid, chlorogenic acid, caffeic acid, curcumin, and quercetin or a derivative of any of the plant-derived polyphenolic compounds. A derivative of the gallic acid is ethyl gallate.

A mixing ratio of each of the compounds is 0.05 to 10 parts by weight for the whole of the lubricating oil composition.

The lubricating oil is at least one oil selected from among ester oil and PAO oil.

The oil-impregnated sintered bearing of the present invention is produced by impregnating a sintered molded bearing with the lubricating oil composition.

Effect of the Invention

As described above, the grease composition of the present invention includes the base grease composed of the base oil and the thickener and the additive, containing at least one compound selected from among (1) the plant-derived polyphenolic compounds and (2) the compounds formed by decomposition thereof, which is added to the base grease. By packing the grease composition in the bearing, it is possible to prevent the hydrogen brittleness-caused peculiar peeling from occurring in bearings which are used for cars and industrial machines and improve the resistance to the oxidative deterioration of the grease composition over conventional grease compositions containing an antioxidant and the like. Therefore the grease composition is capable of prolonging the lives of the bearings which are operated at a high temperature and speed.

Because the grease composition of the present invention is packed in the grease-packed bearing of the present invention, it is possible to prevent the peculiar peeling from occurring on the rolling surface with the rolling surface turning into white in its texture. Further the grease composition is excellent in the resistance to the oxidative deterioration and is thus capable of prolonging the life of the bearing which is operated at a high temperature and speed. Therefore the grease-packed bearing can be preferably used for electric parts and auxiliary machines of a car, a fixing roller of a copying machine, home electrical appliances, industrial equipment, and the like which are used in a high temperature and speed rotation.

For example, the grease-packed bearing of the present invention can be preferably used as a rolling bearing for electric parts and auxiliary machines of a car such as an alternator, a compressor, an electromagnetic clutch for a car air conditioner, an intermediate pulley, an electromotive fan motor; and as a bearing for motors for industrial machines such as a motor for a ventilation fan, a blower motor for a fuel battery, a cleaner motor, a fan motor, a servo motor, a stepping motor and motors for electric equipment such as a starter motor of a car, an electromotive power steering motor, a steering-adjusting tilt motor, a wiper motor, and a power window motor. That is, the grease-packed bearing can be preferably used as bearings for motors which are used in a high-temperature rotation and a high-speed rotation.

The grease composition is packed in the universal joint for the propeller shaft of the present invention. Therefore in a sealed environment in which the universal joint is subjected to a high temperature and a high-speed centrifugal force, it has is unlikely to have seizing, is excellent in durability in a high temperature and speed operation, and has a long life.

By using PFPE oil as the base oil of the grease composition and fluororesin particles as the thickener thereof, the bearing is capable of having a long life when the bearing is operated in a high temperature and speed operation. By allowing the bearing to have a long life, cost reduction can be achieved.

By using the base oil containing the ionic liquid composed of the cation component and the anion component for the grease composition, a low friction and a low viscosity can be achieved. By packing the grease composition in the bearing, the bearing is allowed to have a low torque and improved high-temperature durability. Further by using the PTFE resin particles as the thickener, it is possible to provide the base oil containing the ionic liquid with an excellent thickening property and improve the high-temperature durability of the bearing.

As described above, in the lubricating oil composition of the present invention, as the additive, at least one compound selected from among (1) the plant-derived polyphenolic compounds and (2) the compounds formed by the decomposition of the plant-derived polyphenolic compounds is added to the lubricating oil. Therefore in a high-temperature atmosphere, the lubricating oil composition is unlikely to be subjected to oxidative deterioration with elapse of time.

The oil-impregnated sintered bearing of the present invention is produced by impregnating a molded bearing with the lubricating oil composition. Therefore even in a strict condition where oil-impregnated sintered bearing is subjected to both thrust and radial loads in a high-temperature atmosphere, the oil-impregnated sintered bearing is capable of maintaining a stable frictional property for long time.

BEST MODE FOR CARRYING OUT THE INVENTION

Figure 1:
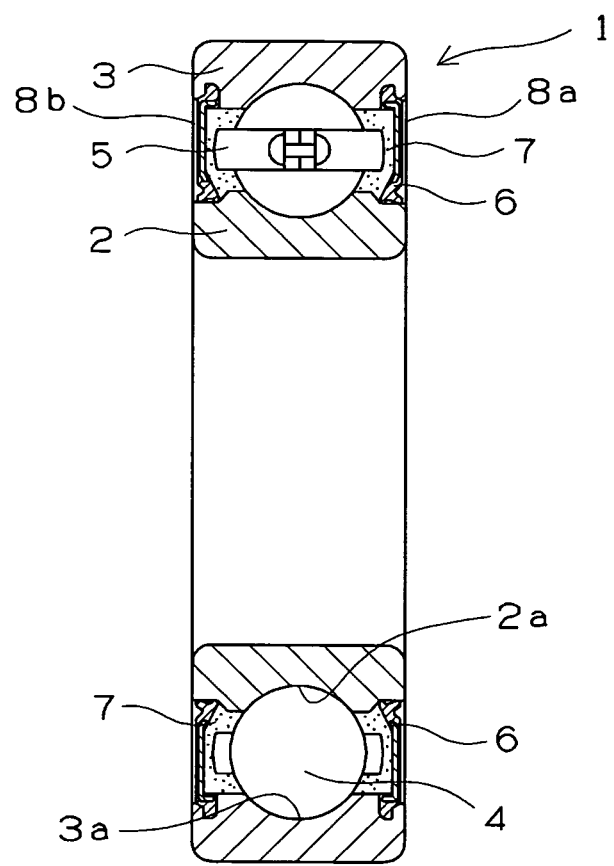
FIG. 1 is a sectional view of a deep groove ball bearing which is an example of the grease-packed bearing of the present invention.

A grease composition containing at least one compound selected from among (1) plant-derived polyphenolic compounds and (2) compounds formed by the decomposition of the plant-derived polyphenolic compounds was packed in a rolling bearing to conduct a sudden acceleration/deceleration test and a high-temperature durability test. As a result, it has been found that the life time of the bearing can be prolonged. It is conceivable that (A): owing to the action of a polar group, the above-described compound easily adheres to the metal surface of the rolling surface of the bearing and makes a reaction on a frictionally worn surface or a newly formed metal surface exposed owing to wear to form an oxide layer on the rolling surface of the bearing. Thereby the generation of hydrogen caused by the decomposition of the grease composition is suppressed, which prevents hydrogen brittleness-caused peculiar peeling from occurring on the rolling surface of the bearing, and (B): the above-described compound acts as an antioxidant for the grease composition, thereby preventing oxidative deterioration. The present invention is based on these findings.

The polyphenolic compound which can be used in the present invention is an aromatic hydroxy compound, having a plurality of hydroxyl groups in one molecule, which is obtained by substituting hydrogen atoms of an aromatic hydrocarbon ring with the hydroxyl groups. The polyphenolic compound is contained in most plants and can be formed by photosynthesis. The polyphenolic compound to be used in the present invention derives from plants.

The compound formed by the decomposition of the plant-derived polyphenolic compound includes aromatic or aliphatic hydroxy compounds generated by hydrolysis of the polyphenolic compound. To obtain an action and an effect similar to those of the polyphenolic compound, it is preferable for the compound formed by the decomposition of the plant-derived polyphenolic compound to have a plurality of hydroxyl groups in one molecule.

As the plant-derived polyphenolic compound or the compound formed by the decomposition thereof, tannin, gallic acid, ellagic acid, chlorogenic acid, caffeic acid, quinic acid, curcumin, quercetin, pyrogallol, theaflavin, anthocyanin, rutin, lignan, and catechin are listed. It is also possible to use the polyphenolic compounds obtained from sesamin, isoflavone, and coumarin which derive from plants. The plant-derived polyphenolic compound or the compounds formed by the decomposition thereof may be used singly or in combination of not less than two kinds thereof.

Of these substances, it is preferable to use the tannin, the gallic acid or derivative thereof, the ellagic acid or derivatives thereof, the chlorogenic acid or derivative thereof, the caffeic acid or derivative thereof, the quinic acid or derivative thereof, the curcumin or derivative thereof, the quercetin or derivative thereof, because these compounds are capable of suppressing the oxidative deterioration for a long time.

In a condition where the grease composition is used in a high temperature condition, it is preferable to use the chlorogenic acid or the derivatives thereof, the curcumin or the derivatives thereof, and the quercetin or the derivatives thereof.

The tannin to be used in the present invention is the polyphenolic compound which is an acidic organic substance containing a lot of phenolic hydroxyl groups in the molecule thereof and having a comparatively large molecular weight. The tannin is an astringent plant component present in the skin of oak, gall (gallnut), and persimmon. The tannin is classified into hydrolyzable tannin and condensed tannin in dependence on a chemical structure.

The hydrolyzable tannin is hydrolyzed into polyphenolic acid and polyvalent alcohol by an acid, an alkali or an enzyme. The polyphenolic acid to be obtained is classified into the gallic acid and a dimer thereof (dehydrated and cyclized in a free state to form tetracyclic ellagic acid). As the polyhydric alcohol to be obtained, pyrogallol and the like are known. The condensed tannin is formed by condensation of carbon-carbon bond of a plurality of molecules of catechin. In the present invention, it is preferable to use the hydrolyzable tannin which provides decomposition products such as the gallic acid, the ellagic acid, and the pyrogallol.

The gallic acid and the ellagic acid to be used in the present invention are polyphenolic acids (polyphenolic compound) to be obtained by hydrolyzing the hydrolysable tannin, as described above. The gallic acid and the ellagic acid have the structure shown in the following formulas (1) and (2) respectively.

[Chemical formula 1]

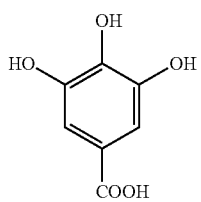

(1)

[Chemical formula 2]

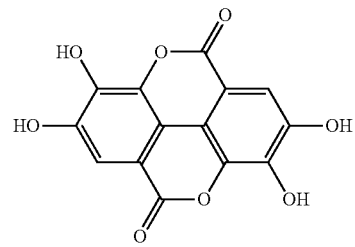

(2)

As the derivatives of the gallic acid to be used in the present invention, gallic acid esters such as methyl gallate, ethyl gallate, propyl gallate, butyl gallate, pentyl gallate, hexyl gallate, heptyl gallate, and octyl gallate and gallates such as bismuth gallate are listed. Of these derivatives, it is more favorable to use the ethyl gallate because the ethyl gallate is excellent in its solubility in lubricating oil. It is also possible to use the derivatives of the ellagic acid.

The chlorogenic acid to be used in the present invention is the polyphenolic compound contained in coffee bean and the like and has the structure shown in the following formula (3).

[Chemical formula 3]

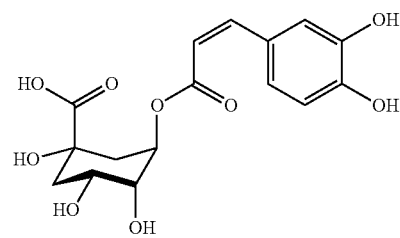

(3)

The caffeic acid to be used in the present invention is a hydrolysate of the chlorogenic acid. The caffeic acid is an aromatic hydroxy compound, having three hydroxyl groups in one molecule, which is obtained by substituting hydrogen atoms of the aromatic hydrocarbon ring with hydroxyl groups and has the structure shown in the following formula (4).

[Chemical formula 4]

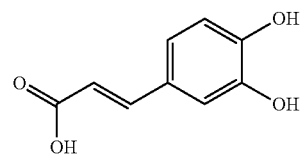

(4)

The quinic acid to be used in the present invention is a hydrolysate of the chlorogenic acid. The quinic acid is an aliphatic hydroxy compound, having five hydroxyl groups in one molecule, which is obtained by substituting hydrogen atoms of an aliphatic hydrocarbon ring with hydroxyl groups and has the structure shown in the following formula (5).

[Chemical formula 5]

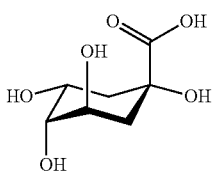
(5)

The curcumin to be used in the present invention is the polyphenolic compound contained in turmeric and the like and has the structure shown in the following formula (6).

[Chemical formula 6]

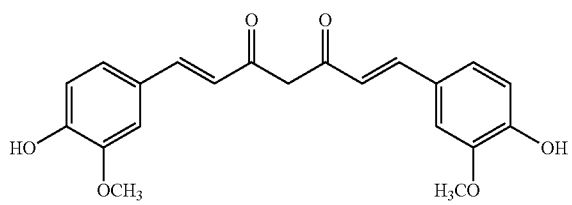
(6)

The quercetin to be used in the present invention is the polyphenolic compound contained in citrus and the like and has the structure shown in the following formula (7).

[Chemical formula 7]

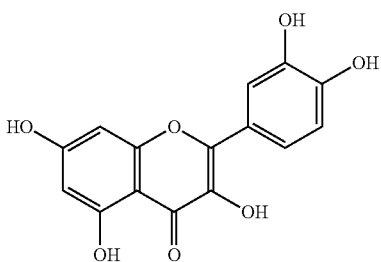
(7)

In the grease composition of the present invention, the mixing ratio of at least one compound selected from among the plant-derived polyphenolic compounds and the compounds formed by the decomposition thereof is favorably 0.05 to 10 parts by weight for 100 parts by weight of the base grease. When the mixing ratio of the above-described compound is less than 0.05 parts by weight, the grease composition is incapable of effectively preventing the occurrence of hydrogen brittleness-caused peeling from occurring on the rolling surface of a rolling bearing or the like and incapable of effectively preventing the oxidative deterioration of the grease either. When the mixing ratio of the compound exceeds 10 parts by weight, it is difficult to improve the effect of preventing the occurrence of the peeling and the oxidative deterioration of a lubricant to a higher extent.

The range of the mixing ratio of the above-described compound is more favorably 0.1 to 5 parts by weight for 100 parts by weight of the base grease. By setting the mixing ratio of the compound to the above-described range, it is possible to effectively prevent the oxidative deterioration of the grease even in the condition where the grease composition is used at high temperatures.

As the base oil which can be used for the grease composition of the present invention, it is possible to list mineral oil such as spindle oil, refrigeration oil, turbine oil, machine oil, and dynamo oil; hydrocarbon synthetic oil such as highly refined mineral oil, liquid paraffin, polybutene oil, GTL oil synthesized by Fischer-Tropsh method, PAO oil, alkylnaphthalene oil, and alicyclic compounds; ester oil such as natural fats and oils, polyol ester oil, phosphate ester oil, polymer ester oil, aromatic ester oil, carbonate ester oil, diester oil, polyglycol coil; and non-hydrocarbon synthetic oil such as silicone oil, polyphenyl ether oil, alkyldiphenyl ether oil, alkylbenzene oil, fluorinated oil. These base oils may be used singly or by mixing not less than two kinds thereof.

As the PAO oil, mixtures of oligomers or polymers consisting of α-olefin or isomerized α-olefin are listed. As examples of the α-olefin, it is possible to list 1-octane, 1-nonen, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and 1-tetradocosene. Normally mixtures of these substances are used.

As the base oil of the grease composition of the present invention, of these base oils, it is favorable to use at least one oil selected from among the alkyldiphenyl ether oil, the ester oil, and the PAO oil because these oils are excellent in heat resistance and lubricating property thereof. In using the alkyldiphenyl ether oil and the ester oil, it is more favorable to use the PAO oil in combination.

The kinematic viscosity of the base oil at 40° C. is favorably 10 to 100 $mm^2$/second and more favorably 10 to 70 $mm^2$/second. When the kinematic viscosity thereof is less than 10 $mm^2$/second, the base oil deteriorates in a short period of time, and a generated deteriorated substance accelerates the deterioration of the entire base oil. Thereby the bearing and the like have a degraded durability and thus have a short life. When the kinematic viscosity thereof exceeds 100 $mm^2$/second, the temperature of the bearing and the like rises greatly owing to an increase in a rotation torque and rises to a higher extent in a high-speed rotation. In this case, even though the polyphenolic compound is added to the base grease, there is a fear that the oxidative deterioration of the grease composition cannot be sufficiently prevented.

As thickeners that can be used for the grease composition of the present invention, it is possible to list metal soaps such as Benton, silica gel, fluorine compounds, lithium soap, lithium complex soap, calcium soap, calcium complex soap, aluminum soap, and aluminum complex soap; urea-based compounds such as a diurea compound, a polyurea compound, and the like; and fluororesins such as PTFE resin, tetrafluoroethylene-perfluoroalkylvinyl ether copolymer (hereinafter referred to as PFA) resin, and tetrafluoroethylene-hexafluoropropylene copolymer (hereinafter referred to as FEP) resin. Of these thickeners, the urea-based compound is desirable in consideration of heat resistance and cost.

The urea-based compound is obtained by a reaction between an isocyanate compound and an amine compound. To prevent a reactive free radical from remaining, it is preferable to use the isocyanate compound and the amine compound in such a way that the isocyanate group and the amino group have an approximately equivalent amount.

The diurea compound is obtained by a reaction between diisocyanate and monoamine. As the diisocyanate, phenylene diisocyanate, tolylene diisocyanate, diphenyl diisocyanate, diphenylmethane diisocyanate, octadecane diisocyanate, decane diisocyanate, and hexane diisocyanate are listed. As the monoamine, octylamine, dodecylamine, hexadecylamine, stearylamine, oleylamine, aniline, p-toluidine, and cyclohexylamine are listed. The polyurea compound is obtained by a reaction between diisocyanate and monoamine as well as diamine. As the diisocyanate and the monoamine, substances similar to those used to generate the diurea compound are used. As the diamine, ethylene diamine, propanediamine, butanediamine, hexanediamine, octanediamine, phenylenediamine, tolylenediamine, xylenediamine, and diaminodiphenylmethane are listed.

By adding the thickener to the base oil, the base grease to which the polyphenolic compound is to be added is obtained. The base grease containing the urea-based compound as its thickener is formed by reacting the isocyanate compound and the amine compound with each other in the base oil.

The mixing ratio of the thickener to 100 parts by weight of the base grease is 1 to 40 parts by weight and preferably 3 to 25 parts by weight. When the content of the thickener is less than one part by weight, thickening effect is small, and greasing is difficult. When the content of the thickener exceeds 40 parts by weight, the obtained base grease is so hard that it is difficult to obtain the desired effect.

As a preferable form of the grease composition of the present invention, the grease composition contains PFPE oil as its base oil and fluororesin particles as its thickener. This form is especially preferable in the condition where the grease composition is used at high temperatures.

As the PFPE oil, it is possible to use compounds obtained by substituting the hydrogen atoms of aliphatic hydrocarbon polyether with fluorine atoms. Exemplifying such PFPE oils, PFPE oils, shown by the following chemical formulas 8 and 9, which have side chains and linear PFPE oils shown by the following chemical formulas 10 through 12 are known. These PFPE oils can be used singly or in combination. Reference symbols m and n are integers.

It is possible to exemplify Fomblin Y (commercial name, produced by Solvay Solexis Inc.) as a commercially available product of the chemical formula 8, Krytox (commercial name, produced by Du Pont kabushiki Kaisha) and BARRIERTA J oil (commercial name, produced by NOK KLUBER CORPORATION) as a commercially available product of the chemical formula 9, Fomblin Z (commercial name, produced by Solvay Solexis Inc.) as a commercially available product of the chemical formula 10, Fomblin M (commercial name, produced by Solvay Solexis Inc.) as a commercially available product of the chemical formula 11, and DEMNUM (commercial name, produced by Daikin Industries Ltd.) as a commercially available product of the chemical formula 12.

[Chemical Formula 8]
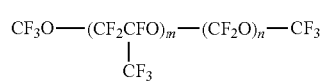
m/n > 40

[Chemical Formula 9]
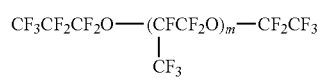

[Chemical Formula 10]
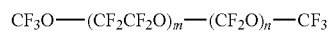
m/n < 1

[Chemical Formula 11]
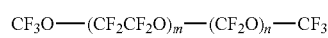
m/n > 1

[Chemical Formula 12]
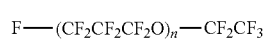

In these forms, as the fluororesin particles to be used as the thickener, it is possible to use particles having a high affinity for the PFPE oil, stability at high temperatures, and a chemical resistance. As the fluororesin, perfluororesin such as the PTFE resin, the PFA resin, and the FEP resin are preferable. The particles of the PTFE resin are especially preferable because they are excellent in the high-temperature stability and chemical resistance thereof.

In these forms, it is preferable to add 50 to 90 wt % of the PFPE oil and 50 to 10 wt % of the fluororesin to the base grease. By setting the mixing ratio of the PFPE oil and that of the fluororesin to the above-described range respectively, the grease to be packed inside the bearing is allowed to have a preferable degree of worked penetration at which the grease has a small leakage and allows a torque to be decreased for a long time.

As other preferable forms of the grease composition of the present invention, it is possible to exemplify the grease composition in which the base oil contains an ionic liquid. This form is especially favorable to allow the grease composition to enhance a low friction and a low viscosity.

The ionic liquid means a substance which becomes a liquid at in the neighborhood of a room temperature, although the ionic liquid is an ion-binding compound composed of a cation component and an anion component. In using the ionic liquid and other oil in combination as the base oil, to maintain heat resistance, it is preferable to set the mixing ratio of the ionic liquid to not less than 50 wt % to the entire base oil.

As the cation component of the ionic liquid that can be used in the present invention, an aliphatic amine cation (see chemical formula 13 shown below), an alicyclic amine cation (see chemical formula 14 shown below), an imidazolium cation (see chemical formula 15 shown below), and a pyridine cation (see chemical formula 16 shown below) are listed. Of these cation components of the ionic liquid, it is preferable to use the imidazolium cation because it is excellent in its heat resistance, flowability at low temperatures, and adaptability to environment. A reference symbol R shown in the chemical formulas 13 through 16 indicates an alkyl group or an alkoxy group.

As the anion component ($X^-$) in the chemical formulas 13 through 16, halide ions, $SCN^-$, $BF_4^-$, $ClO_4^-$, $PF_6^-$, $(CF_3SO_2)_2N^-$, $(CF_3CF_2SO_2)_2N^-$, $CF_3SO_3^-$, $C_3COO^-$, $Ph_4B^-$, $(CF_3SO_2)_3C^-$, and $PF_3(C_2F_5)_3^-$ are listed. Of these anion components, it is preferable to use $(CF_3SO_2)_2N^-$ (bis(trifluoromethylsulfonyl)imide anion) because it is excellent in its heat resistance, flowability at low temperatures, and adaptability to environment.

[Chemical formula 13]
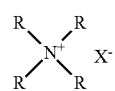

[Chemical formula 14]
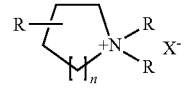

[Chemical formula 15]
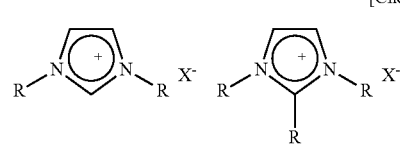

[Chemical formula 16]

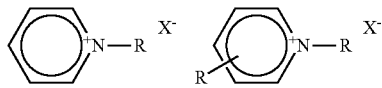

In these forms, it is preferable to set the kinematic viscosity of the base oil to not more than 100 m²/second at 40° C. When the kinematic viscosity of the base oil exceeds 100 m²/second, it is impossible to sufficiently decrease the viscosity of the grease. When only the ionic liquid is used as the base oil, the kinematic viscosity thereof can be adjusted in the above-described range by using the ionic liquid singly or not less than two kinds in combination.

In these forms, as the thickener, the above-described metal soap, the urea-based compound, and the fluororesin are listed. Of these thickeners, to suppress a change of the chemical property of the grease at high temperatures, it is preferable to use the fluororesin particles having a preferable heat resistance. Of the fluororesins, it is especially preferable to use the PTFE resin particles excellent in thickening the ionic liquid which is the base oil.

In these forms, the thickener is contained in the entire grease composition at favorably 3 to 70 wt % and more favorably 5 to 60 wt %. When the content of the thickener is less than 3 wt %, the thickening effect is small, and greasing is difficult. When the content of the thickener exceeds 70 parts by weight, the obtained grease is so hard that it is difficult to obtain the desired effect.

The grease composition of the present invention is capable of containing known additives for grease together with the plant-derived polyphenolic compound as necessary. As the additives, it is possible to list an antioxidant such as an organic zinc compound, amine-based compounds; a metal deactivator such as benzotriazole; a viscosity index improver such as polymethacrylate and polystyrene; a solid lubricant such as molybdenum disulfide and graphite; a corrosion inhibitor such as metal sulfonate, and polyalcohol ester; a friction-reducing agent such as organic molybdenum; an oily agent such as ester and alcohol; and a wear-preventing agent such as phosphorus compounds. These additives may be added to the base grease singly or by mixing not less than two kinds thereof with each other.

The grease composition of the present invention restrains the generation of the hydrogen brittleness-caused peculiar peeling and improves the resistance of the grease to the oxidative deterioration in a high temperature and speed operation. Thus the grease composition is capable of improving the life of the grease-packed bearing. Therefore the grease composition can be used as grease to be packed inside a ball bearing, a cylindrical roller bearing, a tapered roller bearing, a self-aligning roller bearing, a needle roller bearing, a cylindrical roller thrust bearing, a tapered roller thrust bearing, a needle roller thrust bearing, and a self-aligning roller thrust bearing.

The bearing in which the grease composition of the present invention is packed is described below with reference to FIG. 1. FIG. 1 is a sectional view of a deep groove ball bearing which is an example of the grease-packed bearing of the present invention. A grease-packed bearing 1 includes an inner ring 2 having an inner ring rolling surface 2a on its peripheral surface, an outer ring 3 having an outer ring rolling surface 3a on its inner peripheral surface, with the outer ring 3 and the inner ring 2 concentric with each other, and a plurality of rolling elements 4 disposed between the inner ring rolling surface 2a and the outer ring rolling surface 3a. A cage 5 retaining a plurality of the rolling elements 4 is provided. A sealing member 6 fixed to the outer ring 3 is provided at openings 8a and 8b disposed at both axial ends of the inner ring 2 and the outer ring 3. A grease composition 7 is packed essentially on the periphery of each rolling element 4. The grease composition 7 contains the base grease composed of the base oil and the thickener and the additive, containing at least one compound selected from among the plant-derived polyphenolic compounds and the compounds formed by the decomposition thereof, which is added to the base grease.

Figure 2:
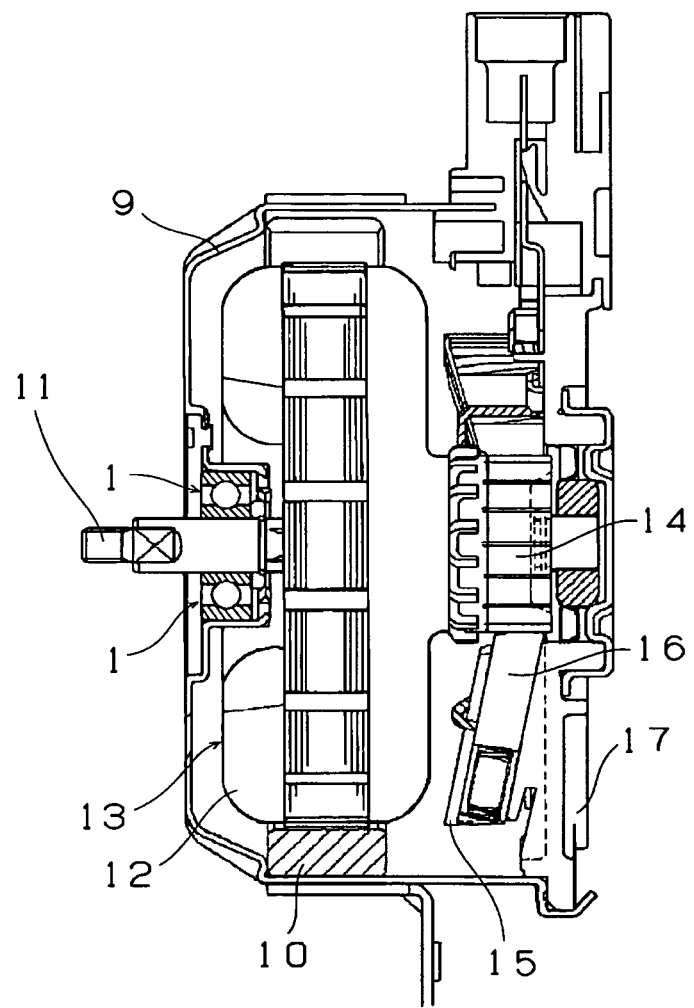
FIG. 2 is a sectional view showing a grease-packed bearing for a motor.

A grease-packed bearing for a motor is described below with reference to FIG. 2 as other embodiment of the grease-packed bearing of the present invention. FIG. 2 is a sectional view of a motor for which the grease-packed bearing of the present invention is used. The motor has a stator 10 consisting of a magnet, for the motor, which is disposed on an inner peripheral wall of a jacket 9, a rotor 13 on which a coil 12 fixed to a rotating shaft 11 is wound, a commutator 14 fixed to the rotating shaft 11, a brush holder 15 disposed on an end frame 17 supported by the jacket 9, and a brush 16 accommodated inside the brush holder 15. The rotating shaft 11 is rotatably supported on the jacket 9 by a grease-packed bearing 1 and a supporting construction for the bearing 1. The grease-packed bearing 1 is the grease-packed bearing of the present invention.

Figure 3:
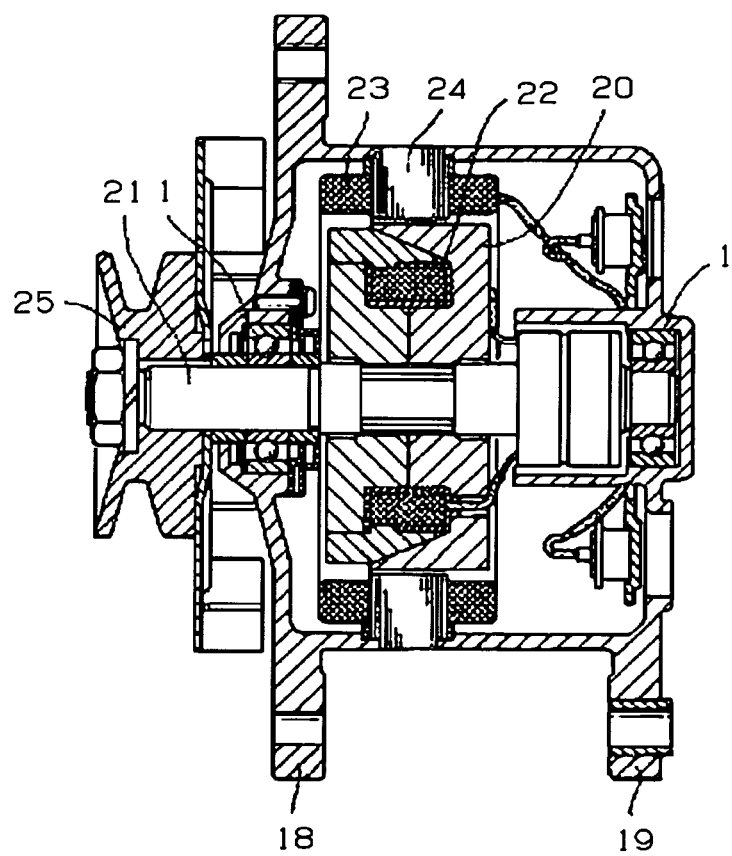
FIG. 3 is a sectional view showing an example of a grease-packed bearing for an alternator.

A grease-packed bearing for an alternator which is an electric auxiliary machine of a car is described below with reference to FIG. 3 as other embodiment of the grease-packed bearing of the present invention. FIG. 3 is a sectional view of the construction of the alternator. In the alternator, a rotating shaft 21 on which a rotor 20 is mounted is rotatably supported on a pair of frames 18, 19 forming a housing which is a stationary member by a pair of grease-packed bearings 1. A rotor coil 22 is mounted on the rotor 20. A three-roll stator coil 24 is mounted on a stator 23 disposed on the periphery of the rotor 20 at a phase of 120°. A rotating shaft 21 of the rotor 20 is driven by a rotational torque transmitted to a pulley 25 mounted on the front end thereof through a belt (not shown). The pulley 25 is mounted on the rotating shaft 21 of the rotor 20 in a cantilevered state. Vibrations are generated when the rotating shaft 21 rotates at a high speed. Thus a grease-packed bearing 1 supporting the pulley 25 is subjected to a very high load. The grease-packed bearing 1 is the grease-packed bearing of the present invention. In this use, a grease composition containing the PFPE oil as its base oil and the fluororesin particles as its thickener is preferably packed in the grease-packed bearing 1.

Figure 4:
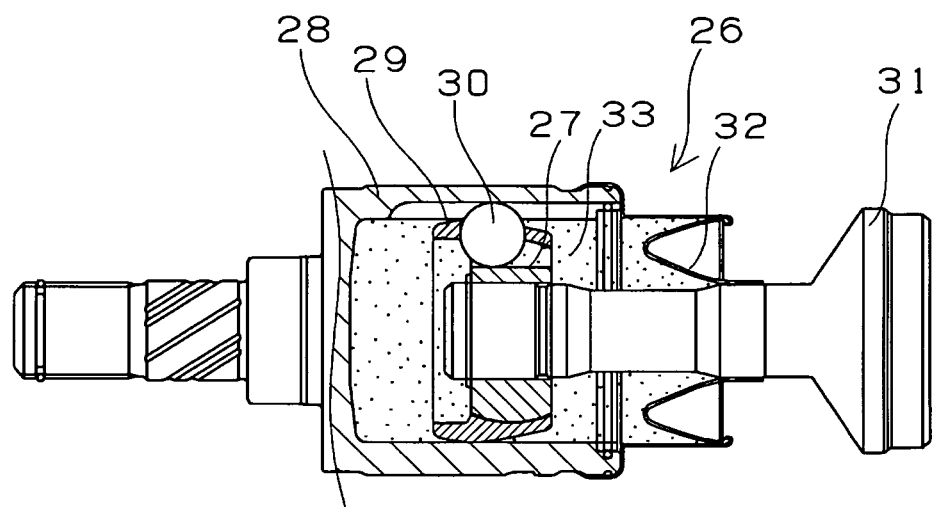
FIG. 4 is a partly cut-away sectional view of a constant-velocity joint, for a propeller shaft, which is an example of a universal joint of the present invention for the propeller shaft.

An example of a universal joint of the present invention for a propeller shaft is described below with reference to a drawing. FIG. 4 is a partly cut-out sectional view of a double off-set type constant-velocity joint for the propeller shaft. As shown in FIG. 4, a constant-velocity joint 26 for the propeller shaft is composed of an inner ring 27, an outer ring 28, a cage 29, and six steel balls 30. Each of the inner ring 27 and the outer ring 28 has a track, parallel with an axis, which accommodates the steel balls. The cage 29 fulfils a roll of controlling the movement of the steel balls 30. To easily roll the steel balls 30, a cylindrical portion is formed on an inside-diameter surface of the case 29, as shown in FIG. 4. A boot 32 covers the periphery of the outer ring 28 and that of a shaft 31. A grease composition 33 of the present invention is packed in a space surrounded with the outer ring 28, the inner ring 27, the steel balls 30, the cage 29, the shaft 31, and the boot 32.

Figure 5:
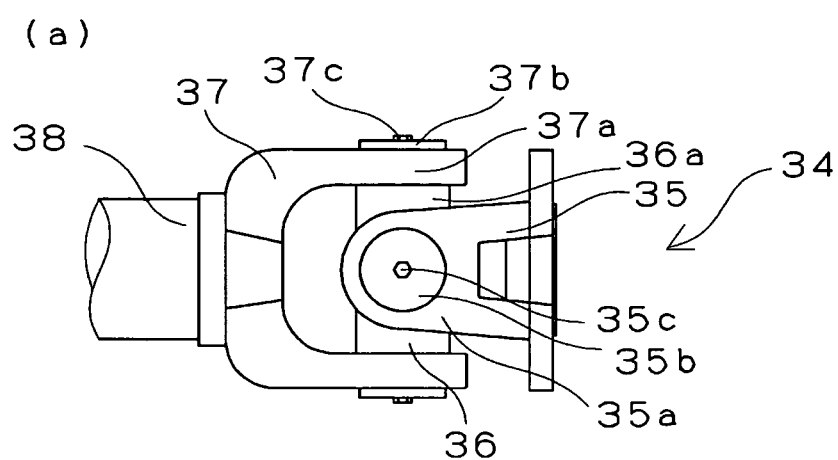
FIG. 5 shows a cardan joint, for a propeller shaft, which is another example of the universal joint of the present invention for the propeller shaft.
Figure 5:
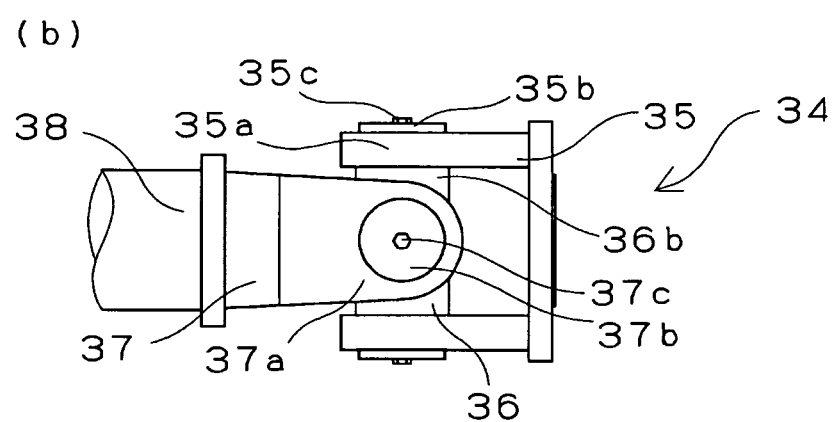

Another example of the universal joint of the present invention for the propeller shaft is described below with reference to a drawing. FIG. 5 shows a cardan joint for the propeller shaft. FIG. 5(a) is a plan view. FIG. 5(b) is a front view. As shown in FIG. 5, a cardan joint 34 for the propeller shaft has a first yoke 35 coupled to a transmission side and rotates, a second yoke 37 transmitting a rotation torque of the first yoke 35 to a propeller shaft 38, and a crossed joint member 36 crosswise coupled to a through-hole formed at bifurcated ends 35a, 35a of the first yoke 35 and a through-hole formed at bifurcated ends 37a, 37a of the second yoke 37 and transmitting the rotation torque of the first yoke 35 to the second yoke 37. The crossed joint member 36 has crossed short axes 36a, 36b. An end portion of the short axis 36a is inserted through the through-holes of the ends 37a, 37a of the second yoke 37 and fixedly coupled to the ends 37a, 37a of the second yoke 37 by means of an engaging nut 37c through a cap 37b of the second yoke 37 with the end portion of the short axis 36a being rotatably supported through an unshown needle bearing. Similarly an end portion of the short axis 36 is inserted through the through-holes of the ends 36a, 36a of the first yoke 35 and fixedly coupled to the ends 35a, 35a of the first yoke 35 by means of an engaging nut 35c through a cap 35b of the first yoke 35 with the end portion of the short axis 36a being rotatably supported through an unshown needle bearing. The grease composition of the present invention is packed in the needle bearing rotatably supporting the end portion of each of the short axes 36a, 36b of the crossed joint member 36.

In using the grease composition of the present invention for the universal joint for the propeller shaft, it is preferable to use the mineral oil such as turbine oil as the base oil and the metal soap such as the lithium soap as the thickener because it is necessary that the turbine oil and the lithium soap are inexpensive and are excellent in oil film formability.

Figure 6:
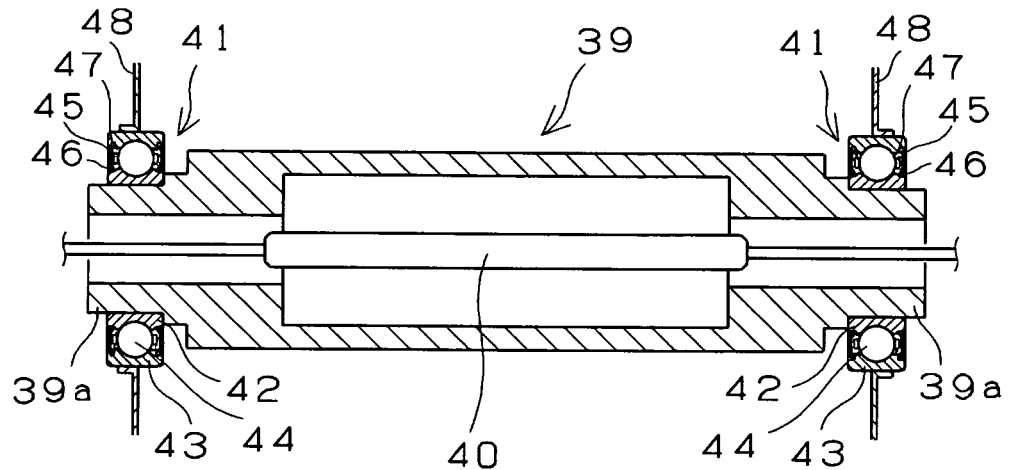
FIG. 6 is a sectional view showing an example of a grease-packed bearing for a fixing roller of a copying machine.

As still another example of the grease-packed bearing of the present invention, a grease-packed bearing to be used for a fixing member is described below with reference to FIG. 6. FIG. 6 shows a fixing roller 39 of a fixing apparatus whose shaft portion 39a is supported by a rolling bearing 41. The fixing roller 39 is hollowly made of aluminum and is heated up to about 200° C. by a halogen heater 40 disposed in a hollow portion thereof. The shaft portion 39a disposed at both ends of the fixing roller 39 is fitted on an inside-diameter surface of an inner ring 42 by loose fitting. An outer ring 43 is fixed to a frame 48 of the fixing apparatus. Between the inner ring 42 and the outer ring 43, there are provided a plurality of rolling elements 44 and a cage 45 holding a plurality of the rolling elements 44. A sealing member 46 fixed to the outer ring 43 is provided. A grease composition 47 of the present invention is packed essentially on the periphery of the rolling elements 44. In this use, it is preferable to use the grease composition 47 of the present invention containing the PFPE oil as its base oil and the fluororesin particles as its thickener.

The lubricating oil composition of the present invention is described below. The present inventors have made energetic examinations of the lubricating oil composition which is used to obtain an oil-impregnated sintered bearing produced by impregnating a sintered molded bearing with the lubricating oil composition to enhance a stable frictional property of the lubricating oil composition containing an additive added to lubricating oil even in a condition in which the oil-impregnated sintered bearing is subjected to both thrust and radial loads in a high-temperature atmosphere. As a result, the present inventors have found that by forming the lubricating oil composition containing at least one compound selected from among (1) the plant-derived polyphenolic compounds and (2) the compounds formed by the decomposition of the plant-derived polyphenolic compounds, it is possible to drastically improve the high-temperature durability of the oil-impregnated sintered bearing for which the lubricating oil composition is used.

The lubricating oil composition of the present invention is formed by adding at least one compound selected from among (1) the plant-derived polyphenolic compounds and (2) the compounds formed by the decomposition thereof to the lubricating oil. The plant-derived polyphenolic compounds and the compounds formed by the decomposition thereof that can be contained in the lubricating oil composition are similar to those to be contained in the grease composition.

The mixing ratio of at least one compound selected from among the plant-derived polyphenolic compounds and the compounds formed by the decomposition thereof to the entire lubricating oil composition is favorably 0.05 to 10 wt % and more favorably 0.1 to 5 wt %. When the mixing ratio of the above-described compound is less than 0.05 parts by weight, the oxidative deterioration of the lubricating oil composition cannot be effectively prevented in dependence on a use condition. When the mixing ratio of the compound exceeds 10 parts by weight, it is difficult to improve the effect of preventing the oxidative deterioration of the lubricant to a higher extent.

Lubricating oil which can be used for the lubricating oil composition is similar to the base oil to be used for the above-described grease composition. Of the above-described lubricating oils, it is preferable to use at least one oil selected from among the ester oil and the PAO oil because these oils are excellent in the heat resistance and lubricating property thereof. It is especially preferable to use the ester oil.

Similarly to the base oil of the grease composition, the kinematic viscosity of the lubricating oil at 40° C. is favorably 10 to 100 mm$^2$/second and more favorably 10 to 70 mm$^2$/second. When the kinematic viscosity thereof is less than 10 mm$^2$/second, the lubricating oil deteriorates in a short period of time, and a generated deteriorated substance accelerates the deterioration of the entire lubricating oil. Therefore there is a fear that the bearing has a degraded durability and thus has a short life. When the kinematic viscosity thereof exceeds 100 mm$^2$/second, the temperature of the bearing rises greatly owing to an increase in a rotation torque and rises to a higher extent in a high-speed rotation. In this case, even though the lubricating oil composition contains the polyphenolic compound, there is a fear that the oxidative deterioration thereof cannot be sufficiently prevented.

The lubricating oil to be used in the present invention is capable of containing various additives such as the antioxidant, the viscosity index improver, and an oiliness improver in a range in which the effect of the present invention is not inhibited.

Figure 7:
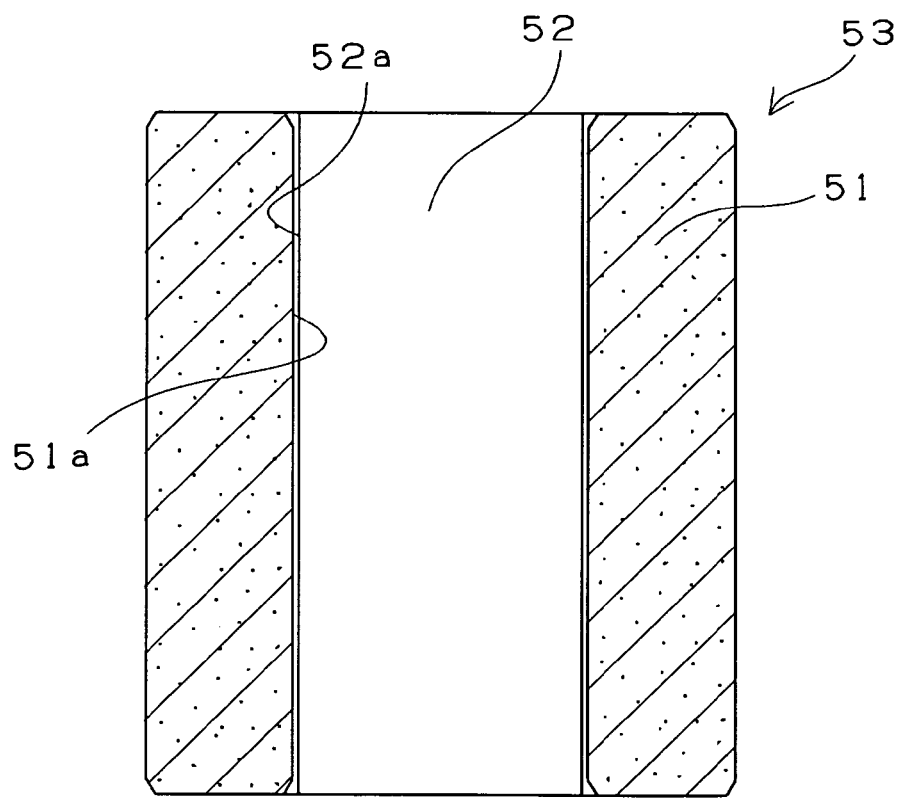
FIG. 7 is a sectional view showing a bearing apparatus for which an oil-impregnated sintered bearing of the present invention is used.

The oil-impregnated sintered bearing of the present invention is described below with reference to the drawing. FIG. 7 is a sectional view showing a bearing apparatus for which the oil-impregnated sintered bearing of the present invention is used. In FIG. 7, a bearing apparatus 53 is constructed of a shaft 52, an oil-impregnated sintered bearing 51 whose cylindrical inner peripheral surface 51a is fitted on a peripheral surface 52a of the shaft 52, and a thrust receiver (not shown) preventing the movement of the oil-impregnated sintered bearing 51 in a thrust direction. The oil-impregnated sintered bearing 51 is composed of a sintered cylindrical molded bearing impregnated with the lubricating oil composition in which at least one compound selected from among (1) the plant-derived polyphenolic compounds and (2) the compounds formed by the decomposition of the plant-derived polyphenolic compounds is added to the lubricating oil.

The material of the sintered molded bearing which is to be used in the present invention is not limited to a specific one, but similarly to conventional bearings produced by molding, it is possible to use bearing formed by sequentially molding necessary metal materials in a compression molding process, a sintering process, and a compression shaping process.

EXAMPLES

Although the present invention is further described below with reference to examples and comparative examples, the present invention is not limited thereto.

In each of the examples and comparative examples, the polyphenolic compounds produced by Tokyo Chemical Industry Co., Ltd. were used.

Examples 1-1 Through 1-10

4,4'-diphenylmethane diisocyanate (MILLIONATE MT (commercial name) hereinafter referred to as MDI produced by Nippon Polyurethane Industry Co., Ltd.) was dissolved at the ratio shown in table 1 in one half of a base oil shown in table 1. Monoamine was dissolved in the remaining half of the base oil at an equivalent weight two times larger than that of the MDI. The mixing ratio and kind of each component are as shown in table 1. The solution in which the monoamine was dissolved was added to the solution in which the MDI was dissolved, while the solution in which the MDI was dissolved was being stirred. Stirring continued for 30 minutes at 100 to 120° C. for reaction to form a diurea-based compound of each example in the base oil. The plant-derived polyphenolic compound and an antioxidant were added to the obtained base grease at the mixing ratios shown in table 1. The base grease was further stirred at 100 to 120° C. for 10 minutes. Thereafter the base grease was cooled and homogenized by using a three-roll to obtain a grease composition of each example. A sudden acceleration/deceleration test was conducted on each of the obtained grease compositions. The test method and the test condition are shown below. Table 1 shows the results.

<Sudden Acceleration/Deceleration Test>

Simulating an alternator which is an example of an electric auxiliary machine, each grease composition was packed in a rolling bearing, having an inner ring which rotates, which supports a rotating shaft to conduct a sudden acceleration/deceleration test. As the drive condition in the sudden acceleration/deceleration test, a load of 1960N was applied to a pulley mounted on the tip of the rotating shaft, and a rotating speed was set to 0 to 18000 rpm. The test was conducted in a state in which electric current of 0.1 A flowed through the test bearing. A generator stopped when the vibration of a vibration detector exceeded a predetermined value because peculiar peeling occurred inside the bearing. The time (life time until before occurrence of peeling, hour) when the generator stopped was measured. The test was finished after the lapse of 500 hours.

Comparative Examples 1-1 Through 1-3

In a method conforming to the method of the example 1-1, each base grease was prepared by selecting the thickener and the base oil at the mixing ratios shown in table 1. In addition, the additive was added to the base grease to obtain the grease composition of each comparative example. A test was conducted on each of the obtained grease compositions in a manner similar to that of the example 1-1 to evaluate the performance of the grease compositions. Table 1 shows the results.

TABLE 1

|  | Example | | | | | | | | | |
| --- | --- | --- | --- | --- | --- | --- | --- | --- | --- | --- |
|  | 1-1 | 1-2 | 1-3 | 1-4 | 1-5 | 1-6 | 1-7 | 1-8 | 1-9 | 1-10 |
| Mixing ratios of components of grease composition (part by weight) Base grease Base oil | | | | | | | | | | |
| PAO oil[1] | — | 15 | 63 | 15 | 15 | 15 | 15 | 15 | 15 | 15 |
| Alkyldiphenyl ether oil[2] | 80 | 63 | 15 | 63 | 63 | 63 | 63 | 63 | 63 | 63 |
| Thickener | | | | | | | | | | |
| Amine: Octylamine | — | — | — | 5.8 | — | — | — | — | — | — |
| Amine: p-toluidine | 9.2 | 10.1 | 10.1 | 4.9 | 10.1 | 10.1 | 10.1 | 10.1 | 10.1 | 10.1 |
| Diisocyanate: MDI[3] | 10.8 | 11.9 | 11.9 | 11.3 | 11.9 | 11.9 | 11.9 | 11.9 | 11.9 | 11.9 |
| Total of mixing ratios of components of base grease | 100 | 100 | 100 | 100 | 100 | 100 | 100 | 100 | 100 | 100 |
| Additive | | | | | | | | | | |
| Antioxidant[4] | 1 | 1 | 1 | 1 | 1 | 1 | 1 | 1 | 1 | 1 |
| Ethyl gallate[5] | 1 | 1 | 1 | 1 | 0.1 | 5 | — | — | — | — |
| Ellagic acid[6] | — | — | — | — | — | — | 1 | — | — | — |
| Chlorogenic acid[7] | — | — | — | — | — | — | — | 1 | — | — |
| Curcumin[8] | — | — | — | — | — | — | — | — | 1 | — |
| Quercetin[9] | — | — | — | — | — | — | — | — | — | 1 |
| Life until before occurrence of peeling, h | >500 | >500 | >500 | 400 | >500 | >500 | >500 | >500 | >500 | >500 |

TABLE 1-continued

| | Comparative example | | |
|---|---|---|---|
| | 1-1 | 1-2 | 1-3 |
| Mixing ratios of components of grease composition (part by weight) Base grease Base oil | | | |
| PAO oil[1] | 15 | 15 | 15 |
| Alkyldiphenyl ether oil[2] | 63 | 63 | 63 |
| Thickener | | | |
| Amine: Octylamine | — | — | — |
| Amine: p-toluidine | 10.1 | 10.1 | 10.1 |
| Diisocyanate: MDI[3] | 11.9 | 11.9 | 11.9 |
| Total of mixing ratios of components of base grease | 100 | 100 | 100 |
| Additive | | | |
| Antioxidant[4] | 1 | 1 | 1 |
| Ethyl gallate[5] | — | 0.02 | 15 |
| Ellagic acid[6] | — | — | — |
| Chlorogenic acid[7] | — | — | — |
| Curcumin[8] | — | — | — |
| Quercetin[9] | — | — | — |
| Life until before occurrence of peeling, h | 200 | 330 | 160 |

[1] Produced by Nippon Steel Chemical Co., Ltd.: SYNFLUID 601, kinematic viscosity at 40° C.: 30 mm$^2$/sec
[2] Produced by MORESCO Corporation: MORESCO-HILUBE LB100, kinematic viscosity at 40° C.: 97 mm$^2$/sec
[3] Produced by Nippon Polyurethane Industry Co., Ltd.: MILLIONATE MT
[4] Produced by Sumitomo Chemical Co., Ltd.: Hindered phenol
[5] through [9] Reagent As shown in table 1, in the sudden acceleration/deceleration test of the examples 1-1 through 1-10, not less than 400 hours were shown. It is conceivable that owing to the action of the plant-derived polyphenolic compound used as the additive of the grease composition, the grease compositions of the examples 1-1 through 1-10 were capable of preventing the peculiar peeling from occurring on the rolling surface with the rolling surface turning into white in its texture. On the other hand, in the sudden acceleration/deceleration test of the comparative example 1-1 in which only the antioxidant (hindered phenol) was added to the base grease as the additive of the grease composition, the life until before occurrence of peeling was much shorter than those of the examples.

Examples 1-11 Through 1-17

The MDI was dissolved at the ratio shown in table 2 in one half of the base oil shown in table 2. The monoamine was dissolved in the remaining half of the base oil at an equivalent weight two times larger than that of the MDI. The mixing ratio and kind of each component are as shown in table 2. The solution in which the monoamine was dissolved was added to the solution in which the MDI was dissolved, while the solution in which the MDI was dissolved was being stirred. Stirring continued for 30 minutes at 100 to 120° C. for reaction to form the diurea-based compound of each example in the base oil. The plant-derived polyphenolic compound was added to the obtained base grease at the mixing ratios shown in table 2. The base grease was further stirred at 100 to 120° C. for 10 minutes. Thereafter the base grease was cooled and homogenized by using the three-roll to obtain the grease composition of each example. A high-temperature durability test 1 was conducted on each of the obtained grease compositions. The test method and test condition are shown below. Table 2 shows the results.

<High-Temperature Durability Test 1>

The rolling bearing (dimension of bearing: inner diameter: 20 mm, outer diameter: 47 mm, and width: 14 mm) was rotated at 10000 rpm in a condition in which the temperature of the outside-diameter portion of the outer ring thereof was set to 150° C., a radial load was set to 67N, and an axial load was set to 67N with 0.7 g of the grease composition being packed therein. The period of time (life at high temperature and speed (150° C., hour) until before seizing occurred was measured.

Comparative Examples 1-4 and 1-5

In a method conforming to that of the example 1-11, the base grease of each comparative example was prepared at the mixing ratios shown in table 2 by selecting the thickener and the base oil. In addition, the additive was added to each base grease to obtain the grease composition of each comparative example. A test similar to that of the example 1-11 was conducted on each of the obtained grease compositions to evaluate the high-temperature durability of each grease composition. Table 2 shows the results.

Example 1-18

After lithium 12-hidroxy stearate was added to the mineral oil at the mixing ratio shown in table 2, the mixture was heated while the mixture was being stirred to dissolve the lithium 12-hidroxy stearate in the mineral oil. After the mixture was cooled, the plant-derived polyphenolic compound was added to the mixture at the mixing ratio shown in table 2. The mixture was further stirred at 100 to 120° C. for 10 minutes. Thereafter the mixture was cooled and homogenized by using the three-roll to obtain the grease composition of the example 1-18. A high-temperature durability test 2 was conducted on the obtained grease composition. The test method and test condition are shown below. Table 2 shows the results.

<High-Temperature Durability Test 2>

The rolling bearing (dimension of bearing: inner diameter: 20 mm, outer diameter: 47 mm, and width: 14 mm) was rotated at 10000 rpm in a condition in which the temperature of the outside-diameter portion of the outer ring thereof was set to 120° C., the radial load was set to 67N, and the axial load was set to 67N with 0.7 g of the grease composition being packed therein. The period of time (life at high temperature and speed (120° C., hour) until before seizing occurred was measured.

Comparative Example 1-6

The additive shown in table 2 was added to the base grease used in the example 1-18 to obtain the grease composition of the comparative example 1-6. A test was conducted on the obtained grease composition in a manner similar to that of the example 1-18 to evaluate the high-temperature durability thereof. Table 2 shows the test results.

TABLE 2

|  | Example |  |  |  |  |  |  |  |
|---|---|---|---|---|---|---|---|---|
|  | 1-11 | 1-12 | 1-13 | 1-14 | 1-15 | 1-16 | 1-17 | 1-18 |
| Mixing ratios of components of grease composition (part by weight) Base grease Base oil | | | | | | | | |
| Ester oil[1] | 26.1 | 26.1 | 26.1 | 26.1 | 26.1 | 26.1 | 26.1 | — |
| PAO oil[2] | 60.9 | 60.9 | 60.9 | 60.9 | 60.9 | 60.9 | 60.9 | — |
| Mineral oil[13] | — | — | — | — | — | — | — | 90 |
| Thickener | | | | | | | | |
| Amine: Octylamine | 6.6 | 6.6 | 6.6 | 6.6 | 6.6 | 6.6 | 6.6 | — |
| Diisocyanate: MDI[3] | 6.4 | 6.4 | 6.4 | 6.4 | 6.4 | 6.4 | 6.4 | — |
| Lithium 12-hydroxystearate | — | — | — | — | — | — | — | 10 |
| Total of mixing ratios of components of base grease | 100 | 100 | 100 | 100 | 100 | 100 | 100 | 100 |
| Additive | | | | | | | | |
| Antioxidant[4] | — | — | — | — | — | — | — | — |
| Antioxidant[5] | — | — | — | — | — | — | — | — |
| Ethyl gallate[6] | 2 | — | — | — | — | — | — | — |
| Ellagic acid[7] | — | 2 | — | — | — | — | — | — |
| Chlorogenic acid[8] | — | — | 2 | — | — | — | — | — |
| Caffeic acid[9] | — | — | — | 2 | — | — | — | — |
| Quinic acid[10] | — | — | — | — | 2 | — | — | — |
| Curcumin[11] | — | — | — | — | — | 2 | — | 2 |
| Quercetin[12] | — | — | — | — | — | — | 2 | — |
| Kinematic viscosity at 40° C. (mm$^2$/sec) | 40 | 40 | 40 | 40 | 40 | 40 | 40 | 100 |
| Worked penetration (JIS k2220) | 245 | 245 | 245 | 245 | 245 | 245 | 250 | — |
| Life at high temperature and speed (150° C.), h | 1400 | 1500 | 1800 | 2000 | 1500 | 2800 | 2300 | — |
| Life at high temperature and speed (120° C.), h | — | — | — | — | — | — | — | 410 |

|  | Comparative example |  |  |
|---|---|---|---|
|  | 1-4 | 1-5 | 1-6 |
| Mixing ratios of components of grease composition (part by weight) Base grease Base oil | | | |
| Ester oil[1] | 26.1 | 26.1 | — |
| PAO oil[2] | 60.9 | 60.9 | — |
| Mineral oil[13] | — | — | 90 |
| Thickener | | | |
| Amine: Octylamine | 6.6 | 6.6 | — |
| Diisocyanate: MDI[3] | 6.4 | 6.4 | — |
| Lithium 12-hydroxystearate | — | — | 10 |
| Total of mixing ratios of components of base grease | 100 | 100 | 100 |
| Additive | | | |
| Antioxidant[4] | 2 | — | 2 |
| Antioxidant[5] | 2 | — | — |
| Ethyl gallate[6] | — | — | — |
| Ellagic acid[7] | — | — | — |
| Chlorogenic acid[8] | — | — | — |
| Caffeic acid[9] | — | — | — |
| Quinic acid[10] | — | — | — |
| Curcumin[11] | — | — | — |

TABLE 2-continued

|  |  |  |  |
|---|---|---|---|
| Quercetin[12] | — | — | — |
| Kinematic viscosity at 40° C. (mm²/sec) | 40 | 40 | 100 |
| Worked penetration (JIS k2220) | 250 | 250 | — |
| Life at high temperature and speed (150° C.), h | 800 | 210 | — |
| Life at high temperature and speed (120° C.), h | — | — | 250 |

[1] Produced by Nippon Steel Chemical Co., Ltd.: Hatcol H2362, kinematic viscosity at 40° C.: 72 mm²/sec
[2] Produced by Nippon Steel Chemical Co., Ltd.: SYNFLUID 601, kinematic viscosity at 40° C.: 30 mm²/sec
[3] Produced by Nippon Polyurethane Industry Co., Ltd.: MILLIONATE MT
[4] Alkylated diphenylamine
[5] Zinc alkyl dithiophosphate
[6] through [12] Reagent
[13] Additive-free turbine oil produced by Nippon Oil Corporation As shown in table 2, in the high-temperature durability test, the examples 1-11 through 1-17 were excellent in the high-temperature durability because the lives of the grease compositions were all not less than 1400 hours. It is conceivable that the plant-derived polyphenolic compound used as the additives of the grease compositions were capable of preventing the oxidative deterioration of the grease compositions. On the other hand, in the comparative example 1-4 in which the same base oil as that used in the examples 1-11 through 1-17 and two antioxidants were used. The life time of the grease composition was much shorter than those of the examples 1-11 through 1-17. In the grease compositions containing the base grease composed of the mineral oil and the lithium soap, in the high-temperature durability test, the grease composition of the example 1-18 in which the plant-derived polyphenolic compound was added to the base grease showed a high-temperature durability not less than 1.5 times as much as that of the grease composition of the comparative example 1-6 in which the antioxidant other than the plant-derived polyphenolic compound was added to the base grease as the additive.

Examples 2-1 Through 2-3

After the polyphenolic compound was added to commercially available fluorine grease (NOXLUBE BF2420 produced by NOK KLUBER CORPORATION (base oil: PFPE oil, thickener: PTFE resin particles)) at the mixing ratios shown in table 3, the mixture was stirred at 100 to 120° C. for 10 minutes. Thereafter the mixture was cooled and homogenized by using the three-roll to obtain a grease composition of each example. A high-temperature durability test was conducted on the obtained grease composition of each example. The test method and test condition are shown below. Table 3 shows the test results. The relative ratio of the cost of each grease-packed bearing was calculated from a life time at a high temperature and speed by using the case of the comparative example 2-1 as the reference.

<High-Temperature Durability Test>

A rolling bearing of 6204ZZ (dimension of bearing: inner diameter: 20 mm, outer diameter: 47 mm, and width: 14 mm) well cleaned with petroleum benzine was rotated at 10000 rpm in a condition in which the temperature of the outside-diameter portion of the outer ring thereof was set to 200° C., the radial load was set to 67N, and the axial load was set to 67N with 0.7 g of the grease composition being packed therein. The period of time until before seizing occurred was measured.

Comparative Example 2-1

A test similar to those of the examples was conducted on the grease commercially available (NOXLUBE BF2420 produced by NOK KLUBER CORPORATION) to evaluate the high-temperature durability thereof. Table 3 shows the results.

Comparative Example 2-2

BHT (dibutylhydroxytoluene) which is a phenolic antioxidant was added to the grease commercially available (NOXLUBE BF2420 produced by NOK KLUBER CORPORATION) at the mixing ratio shown in table 3. A test similar to that of the examples was conducted on the obtained grease composition to evaluate the high-temperature durability thereof. Table 3 shows the results.

TABLE 3

|  | Example | | | Comparative example | |
|---|---|---|---|---|---|
|  | 2-1 | 2-2 | 2-3 | 2-1 | 2-2 |
| Mixing ratios of components of grease composition (part by weight) | | | | | |
| Fluorine grease [1] | 100 | 100 | 100 | 100 | 100 |
| Additive | | | | | |
| Chlorogenic acid [2] | 2 | — | — | — | — |
| Curcumin [3] | — | 2 | — | — | — |
| Quercetin [4] | — | — | 2 | — | — |
| BHT [5] | — | — | — | — | 2 |
| Kinematic viscosity at 40° C. (mm²/sec) | 240 | 240 | 240 | 240 | 240 |
| Life at high temperature and speed, h | 800 | 900 | 1200 | 600 | 600 |
| Relative ratio of cost | 0.75 | 0.67 | 0.50 | 1.00 | 1.00 |

[1] Produced by NOK KLUBER CORPORATION: NOXLUBE BF2420, kinematic viscosity at 40° C.: 240 mm²/sec
[2] through [4] Reagent
[5] Dibutylhydroxytoluene As shown in table 3, in the high-temperature durability test, the grease compositions of the examples 2-1 through 2-3 were excellent in the high-temperature durability because the lives of all of the grease compositions were not less than 800 hours. It is conceivable that in addition to the use of the particular fluorine grease, the polyphenolic compound used as the additive of each of the grease compositions was capable of preventing the oxidative deterioration thereof. On the other hand, the lives of the grease compositions of the comparative example 2-1 and 2-2 were much shorter than those of the examples.

Examples 3-1 Through 3-4

The grease composition of each example was obtained by using the base oils, the thickener, and the polyphenolic compound at the mixing ratios shown in table 4. As the ionic liquid which was the base oil, 1-octyl-3-methylimidazolium-bis(trifluoromethylsulfinyl)imide (shown in the following chemical formula 17, described as OMI-TFSI in table 4), produced by Merck Ltd., which contained the cation component consisting of 1-octyl-3-methylimidazolium cation and the anion component consisting of bis(trifluoromethylsulfinyl)imide anion was used. The obtained specimen grease composition of each example was subjected to a high-temperature and high-speed the grease life test shown below to measure the life time of each grease in a high temperature and speed rotation. Table 4 shows the results.

[Chemical Formula 17]

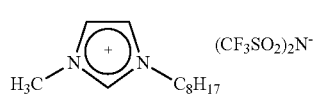

<High-Temperature and High-Speed Test of Grease Life>

The obtained specimen grease of each example was packed in a rolling bearing of 6204 (inner diameter 20 mm×outer diameter 47 mm×width 14 mm) at 38% of the entire volume thereof. Thereafter the rolling bearing was rotated at 180° C. and 10000 rpm in the condition of a radial load of 67N and an axial load of 67N. The period of time until before seizing occurred was measured as the life time of the grease in a high temperature and speed rotation.

Examples 3-5

The grease composition was obtained by using the base oil, the thickener, and the polyphenolic compound at the mixing ratio shown in table 4. As the ionic liquid which is the base oil, 1-hexyl-3-methylimidazolium-bis(trifluoromethylsulfinyl) imide (shown in the following chemical formula 18, shown as HMI-TFSI in table 4), produced by Merck Ltd., which contained the cation component consisting of 1-hexyl-3-methylimidazolium cation and the anion component consisting of bis(trifluoromethylsulfinyl)imide anion was used. The obtained specimen grease composition was subjected to the above-described high-temperature and high-speed grease life test to measure the life time of the grease in a high temperature and speed rotation. Table 4 shows the results.

[Chemical Formula 18]

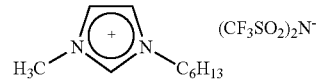

Comparative Example 3-1

Except that the polyphenol was not used, the grease composition was obtained by processing the components similarly to the examples 3-1 through 3-4. The obtained specimen grease composition was subjected to the above-described high-temperature and high-speed grease life test to measure the life time of the grease in a high temperature and speed rotation. Table 4 shows the results.

Comparative Example 3-2

Except that the polyphenol was not used, the grease composition was obtained by processing the components similarly to the example 3-5. The obtained specimen grease composition was subjected to the above-described high-temperature and high-speed grease life test to measure the life time of the grease in a high temperature and speed rotation. Table 4 shows the results.

Comparative Examples 3-3 Through 3-5

The grease composition of each example was obtained by using the base oil, the thickener, and the antioxidant commercially available at the mixing ratios shown in table 4. As the ionic liquid which is the base oil, the 1-octyl-3-methylimidazolium-bis(trifluoromethylsulfinyl)imide (shown in the above-described chemical formula 17, described as OMI-TFSI in table 4), produced by Merck Ltd., which contained the cation component consisting of the 1-octyl-3-methylimidazolium cation and the anion component consisting of the bis(trifluoromethylsulfinyl)imide anion was used. The obtained specimen grease composition of each comparative example was subjected to the high-temperature and high-speed grease life test shown below to measure the life time of each grease in a high temperature and speed rotation. Table 4 shows the results.

TABLE 4

|  | Example ||||| Comparative example |||||
| --- | --- | --- | --- | --- | --- | --- | --- | --- | --- | --- |
|  | 3-1 | 3-2 | 3-3 | 3-4 | 3-5 | 3-1 | 3-2 | 3-3 | 3-4 | 3-5 |
| Mixing ratios of components of grease composition (part by weight) Base grease Base oil | | | | | | | | | | |
| OMI-TFSI[1] | 70 | 70 | 70 | 70 | — | 70 | — | 70 | 70 | 70 |
| HMI-TFSI[2] | — | — | — | — | 70 | — | 70 | — | — | — |
| Thickener | | | | | | | | | | |
| Polytetrafluoroethylene resin | 30 | 30 | 30 | 30 | 30 | 30 | 30 | 30 | 30 | 30 |
| Total of mixing ratios of components of base grease | 100 | 100 | 100 | 100 | 100 | 100 | 100 | 100 | 100 | 100 |
| Additive Polyphenol | | | | | | | | | | |
| Curcumin | 0.1 | 2 | 5 | — | 2 | — | — | — | — | — |
| Quercetin | — | — | — | 2 | — | — | — | — | — | — |

TABLE 4-continued

|  | Example | | | | | Comparative example | | | | |
| --- | --- | --- | --- | --- | --- | --- | --- | --- | --- | --- |
|  | 3-1 | 3-2 | 3-3 | 3-4 | 3-5 | 3-1 | 3-2 | 3-3 | 3-4 | 3-5 |
| Antioxidant | | | | | | | | | | |
| Alkylated diphenylamine | — | — | — | — | — | — | — | 2 | — | — |
| ZnDTP[3] | — | — | — | — | — | — | — | — | 2 | — |
| BHT[4] | — | — | — | — | — | — | — | — | — | 2 |
| Life of grease at high temperature and speed, h | 300 | 500 | 280 | 450 | 480 | 130 | 120 | 140 | 150 | 140 |

[1] Produced by Merck Ltd.: kinematic viscosity at 20° C.: 91 mm$^2$/sec
[2] Produced by Merck Ltd.: kinematic viscosity at 20° C.: 44 mm$^2$/sec
[3] Zinc alkyl dithiophosphate
[4] Dibutylhydroxytoluene As shown in table 4, the grease compositions of the examples 3-1 through 3-5 are useful as the lubricant for a bearing and the like subjected to a high temperature and speed rotation.

Examples 4-1 Through 4-5, Comparative Examples 4-1 Through 4-2

Figure 8:
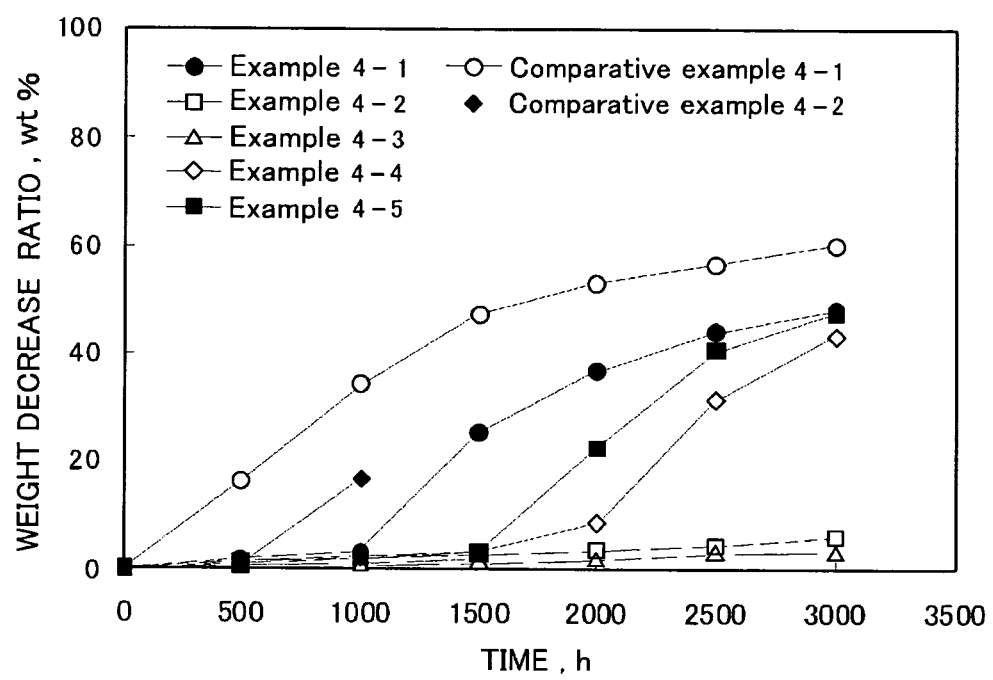
FIG. 8 shows results of measurement of a weight decrease ratio when a lubricating oil composition is left at a high temperature.

A predetermined amount of each of the additives shown in table 5 was added to the ester oil (KAOLUBE 268 produced by Kao Corporation, kinematic viscosity at 40° C.: 30$^2$ mm/second) used as the lubricating oil to obtain the lubricating oil composition of each of the examples and the comparative examples. The predetermined amount of each of different kinds of the additives was added to the lubricating oil to obtain each lubricating oil composition. The high-temperature durability of each of the obtained lubricating oil compositions was evaluated by measuring the weight decrease ratio thereof when each lubricating oil composition was left at a high temperature. The specimen lubricating oil compositions were left in a constant-temperature bath of 150° C. in an air atmosphere. The lubricating oil compositions were taken out of the constant-temperature bath when the heating period of time reached 500, 1000, 1500, 2000, 2500, and 3000 hours to measure the weight decrease ratios thereof. FIG. 8 and table 5 show the results.

Weight decrease ratio=100×(weight(g) of lubricating oil composition before left in constant-temperature bath−Weight(g) of lubricating oil composition after left in constant-temperature bath)/ weight(g) of lubricating oil composition before left in constant-temperature bath

TABLE 5

|  | Example | | | | | Comparative example | |
| --- | --- | --- | --- | --- | --- | --- | --- |
|  | 4-1 | 4-2 | 4-3 | 4-4 | 4-5 | 4-1 | 4-2 |
| Mixing ratios of components of lubricating oil composition (wt %) | | | | | | | |
| Ester oil[1] | 99 | 99 | 99 | 99 | 99 | 100 | 99 |
| Additive | | | | | | | |
| Ethyl gallate[2] | 1 | — | — | — | — | — | — |
| Chlorogenic acid[3] | — | 1 | — | — | — | — | — |
| Quercetin[4] | — | — | 1 | — | — | — | — |
| Curcumin[5] | — | — | — | 1 | — | — | — |
| Caffeic acid[6] | — | — | — | — | 1 | — | — |
| Alkylated diphenylamine[7] | — | — | — | — | — | — | 1 |
| Weight decrease ratio, wt % | | | | | | | |
| Heating period of time, 0 hr | 0 | 0 | 0 | 0 | 0 | 0 | 0 |
| Heating period of time, 500 hr | 1.74 | 0.99 | 0.63 | 1.29 | 1.49 | 16.57 | 1.06 |
| Heating period of time, 1000 hr | 3.07 | 2.00 | 1.10 | 2.25 | 2.35 | 34.52 | 17.00 |
| Heating period of time, 1500 hr | 26.52 | 2.92 | 1.65 | 3.32 | 3.35 | 47.31 | — |
| Heating period of time, 2000 hr | 36.81 | 3.70 | 2.25 | 8.71 | 22.69 | 52.96 | — |
| Heating period of time, 2500 hr | 43.92 | 4.68 | 3.06 | 31.61 | 40.85 | 56.59 | — |
| Heating period of time, 3000 hr | 48.50 | 6.19 | 3.50 | 43.27 | 47.66 | 60.11 | — |

[1] Produced by Kao Corporation: KAOLUBE 268
[2] through [6] Reagent
[7] Produced by Ouchi Shinko Chemical Industrial Co., Ltd.: NOCRAC AD-F As shown in FIG. 8 and table 5, the weight decrease ratios of the lubricating oil compositions of the examples containing the plant-derived polyphenolic compound were superior to those of the comparative examples in the high-temperature durability thereof.

INDUSTRIAL APPLICABILITY

The grease-packed bearing where the grease composition of the present invention is packed can be preferably used as a rolling bearing for electric parts and auxiliary machines of a car, a copying machine, home electrical appliances, industrial equipment, and the like; particularly as a rolling bearing for the electric parts and auxiliary machines of a car such as an alternator, a compressor, an electromagnetic clutch for a car air conditioner, an intermediate pulley, an electromotive fan motor and as a bearing for motors for industrial machines such as a motor for a ventilation fan, a blower motor for a fuel battery, a cleaner motor, a fan motor, a servo motor, a stepping motor and motors for electric equipment such as a starter motor of a car, an electromotive power steering motor, a steering-adjusting tilt motor, a wiper motor, and a power window motor. The universal joint in which the grease composition is packed can be preferably used for a propeller shaft of a car. The oil-impregnated sintered bearing of the present invention impregnated with the lubricating oil composition can be preferably used as a bearing for supporting rotating shafts of rotating parts of the copying machine, a printer, and the like.

EXPLANATION OF REFERENCE NUMERALS AND SYMBOLS

1: grease-packed bearing (deep groove ball bearing)
2: inner ring
3: outer ring
4: rolling element
5: cage
6: sealing member
7: grease composition
8a: openings at both ends
8b: openings at both ends
9: jacket
10: stator
11: rotating shaft
12: winding
13: rotor
14: commutator
15: brush holder
16: brush
17: end frame
18: frame
19: frame
20: rotor
21: rotor rotating shaft
22: rotor coil
23: stator
24: stator coil
25: pulley
26: constant-velocity joint for propeller shaft
27: inner ring
28: outer ring
29: cage
30: steel ball
31: shaft
32: boot
33: grease composition
34: cardan joint for propeller shaft
35: first yoke
36: crossed joint member
37: second yoke
38: propeller shaft
39: fixing roller
39a: shaft portion
40: halogen heater
41: rolling bearing (deep groove ball bearing)
42: inner ring
43: outer ring
44: rolling element
45: cage
46: sealing member
47: grease composition
48: frame
51: oil-impregnated sintered bearing (including specimen)
52: shaft
53: bearing apparatus

The invention claimed is:

1. A grease composition comprising a base grease composed of a base oil and a thickener, and an additive added to said base grease, wherein a kinematic viscosity of said base oil is 10 to 100 mm$^2$/second at 40° C., wherein said additive comprises at least one compound selected from the group consisting of ellagic acid, a derivative of ellagic acid, caffeic acid, curcumin, a derivative of curcumin, quercetin, and a derivative of quercetin which are plant-derived polyphenolic compounds and quinic acid which is a compound formed by decomposition of a plant derived polyphenolic compound.

2. A grease composition comprising a base grease composed of a base oil and a thickener, and an additive added to said base grease, wherein said thickener is a urea-based compound, wherein said additive comprises at least one compound selected from the group consisting of ellagic acid, a derivative of ellagic acid, caffeic acid, curcumin, a derivative of curcumin, quercetin, and a derivative of quercetin which are plant-derived polyphenolic compounds and quinic acid which is a compound formed by decomposition of a plant derived polyphenolic compound.

3. A grease composition comprising a base grease composed of a base oil and a thickener, and an additive added to said base grease, wherein said thickener is a metal soap, wherein said additive comprises at least one compound selected from the group consisting of ellagic acid, a derivative of ellagic acid, caffeic acid, curcumin, a derivative of curcumin, quercetin, and a derivative of quercetin which are plant-derived polyphenolic compounds and quinic acid which is a compound formed by decomposition of a plant derived polyphenolic compound.

4. A grease composition comprising a base grease composed of a base oil and a thickener, and an additive added to said base grease,
wherein said additive comprises at least one compound selected from the group consisting of ellagic acid, a derivative of ellagic acid, chlorogenic acid, a derivative of chlorgenic acid, caffeic acid, a derivative of caffeic acid, curcumin, a derivative of curcumin, quercetin, and a derivative of quercetin which are plant-derived polyphenolic compounds and quinic acid which is a compound formed by decomposition of a plant-derived polyphenolic compound wherein said base oil contains an ionic liquid composed of a cation component and an anion component.

5. The grease composition according to claim 4, wherein said cation component is an imidazolium cation; and said anion component is a bis(trifluoromethylsulfonyl)imide anion.

6. The grease composition according to claim 4, wherein said thickener is fluororesin particles.

7. A grease composition comprising a base grease composed of a base oil and a thickener, and an additive added to said base grease, wherein said base oil is perfluoropolyether oil; and said thickener is fluororesin particles, wherein said additive comprises at least one compound selected from the group consisting of ellagic acid, a derivative of ellagic acid, caffeic acid, curcumin, a derivative of curcumin, quercetin, and a derivative of quercetin which are plant-derived polyphenolic compounds and quinic acid which is a compound formed by decomposition of a plant derived polyphenolic compound.

8. The grease composition according to claim 6 or 7, wherein said fluororesin particles are polytetrafluoroethylene resin particles.

* * * * *